(12) United States Patent
Koide et al.

(10) Patent No.: US 11,908,431 B2
(45) Date of Patent: Feb. 20, 2024

(54) DISPLAY APPARATUS

(71) Applicant: Japan Display Inc., Tokyo (JP)

(72) Inventors: Gen Koide, Tokyo (JP); Akihiro Ogawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/980,050

(22) Filed: Nov. 3, 2022

(65) Prior Publication Data

US 2023/0058005 A1 Feb. 23, 2023

Related U.S. Application Data

(63) Continuation of application No. 17/497,398, filed on Oct. 8, 2021, now Pat. No. 11,562,708, which is a
(Continued)

(30) Foreign Application Priority Data

Mar. 8, 2019 (JP) ................................ 2019-042212

(51) Int. Cl.
*G09G 3/36* (2006.01)
*G02F 1/1362* (2006.01)
*G02F 1/1345* (2006.01)

(52) U.S. Cl.
CPC ....... *G09G 3/3677* (2013.01); *G02F 1/13454* (2013.01); *G02F 1/136286* (2013.01)

(58) Field of Classification Search
CPC ......... G09G 3/3677; G09G 2300/0426; G09G 3/3614; G09G 3/3688; G09G 2330/06;
(Continued)

(56) References Cited

U.S. PATENT DOCUMENTS 9,940,888 B2 4/2018 Ryoo et al.
2006/0262253 A1 11/2006 Teramoto et al.
(Continued)

FOREIGN PATENT DOCUMENTS

CN 106814514 A 6/2017
CN 108806503 A 11/2018
(Continued)

OTHER PUBLICATIONS

Japanese Office Action dated Nov. 1, 2022 in corresponding Japanese Application No. 2019-042212; 6 pages.
(Continued)

*Primary Examiner* — Sahlu Okebato
(74) *Attorney, Agent, or Firm* — Maier & Maier, PLLC

(57) ABSTRACT

A performance of a display apparatus is improved. A display apparatus has a display region, a transparent region and a frame region. The display apparatus includes a plurality of scan signal lines extending in an X direction in the display region and a plurality of image signal lines extending in a Y direction in the display region. The plurality of image signal lines include a first wiring (image signal line) and a second wiring (image signal line). The first wiring includes a first bypass wiring portion arranged in the frame region and a first extension wiring portion connected to an end of the first bypass wiring portion and extending in the Y direction. The second wiring includes a second bypass wiring portion arranged in the frame region and a second extension wiring portion connected to an end of the second bypass wiring portion and extending in the Y direction. In a plan view, the first wiring and the second wiring intersect with each other at the frame region.

10 Claims, 24 Drawing Sheets

Related U.S. Application Data continuation of application No. 16/794,300, filed on Feb. 19, 2020, now Pat. No. 11,176,903.

(58) Field of Classification Search
CPC ...... G09G 2310/0297; G02F 1/136286; G02F 1/13454; G02F 1/133
See application file for complete search history.

(56) References Cited

U.S. PATENT DOCUMENTS

| | | |
|---|---|---|
| 2017/0123452 A1 | 5/2017 | Evans, V et al. |
| 2017/0162637 A1 | 6/2017 | Choi et al. |
| 2017/0278472 A1 | 9/2017 | Fukushima et al. |
| 2018/0069191 A1* | 3/2018 | Lee ...................... H10K 50/844 |
| 2018/0240377 A1 | 8/2018 | Xu et al. |
| 2019/0081127 A1* | 3/2019 | Shim ..................... H10K 77/111 |
| 2019/0121180 A1 | 4/2019 | Ohashi et al. |
| 2021/0141277 A1 | 5/2021 | Kaise et al. |
| 2022/0077193 A1* | 3/2022 | Shin ...................... G06F 3/0443 |

FOREIGN PATENT DOCUMENTS

| | | |
|---|---|---|
| CN | 108957890 A | 12/2018 |
| JP | 2006-343728 A | 12/2006 |
| JP | 2008-233606 A | 10/2008 |
| WO | 2019/009185 A1 | 1/2019 |

OTHER PUBLICATIONS

Office Action dated Oct. 18, 2022, in corresponding Chinese Application No. 202010155126.1, 16 pages.

* cited by examiner

DISPLAY APPARATUS

CROSS-REFERENCE TO RELATED APPLICATION

The present application is a Continuation of U.S. application Ser. No. 17/497,398, filed on Oct. 8, 2021, which is a Continuation of U.S. application Ser. No. 16/794,300, filed Feb. 19, 2020, now U.S. Pat. No. 11,176,903, issued on Nov. 16, 2021, and claims priority from Japanese Patent Application No. 2019-42212 filed on Mar. 8, 2019, the content of each of which is hereby incorporated by reference into this application.

TECHNICAL FIELD OF THE INVENTION

The present invention relates to a technique of a display apparatus, and relates to a technique effectively applied to a display apparatus having a non-display region (hereinafter, referred to as transparent region) that does not overlap a pixel in a display region.

BACKGROUND OF THE INVENTION

A Patent Document 1 (Japanese Patent Application Laid-Open Publication No. 2006-343728) describes a display apparatus in which a light blocking portion is arranged between an image display portion and a transparent display portion. A Patent Document 2 (U.S. Patent Application Laid-Open Publication No. 2017/0123452) describes a display apparatus in which a transparent region is arranged at a position that overlaps a camera.

SUMMARY OF THE INVENTION

For the display apparatus, it is required to decrease an area of the non-display region in the display region as small as possible to increase an occupancy of an effective display region. As a part of approach for the requirement, the inventors of the present application have studied a technique of expanding the area of the display region to, for example, a position at which a region for arrangement of a component such as a camera is surrounded. When the region for the arrangement of the component such as the camera is inside the display region in a plan view, a layout of a lot of signal wirings arranged in the display region becomes an issue. For example, when a transparent region having transmissivity to visible light is arranged inside the display region, it is necessary that a plurality of signal wirings should bypass the transparent region so as not to overlap the transparent region. And, for example, the bypass wirings are densely arranged around the transparent region. Therefore, if coupling occurs between the adjacent signal wirings, the coupling becomes a cause of a potential shift of the signal.

An object of the present invention is to provide a technique of improving a performance of a display apparatus.

A display apparatus according to one aspect of the present invention includes: a first substrate having a display region; a transparent region inside the display region in a plan view; a frame region between the display region and the transparent region in a plan view; a plurality of scan signal lines formed in a first conductive layer on the first substrate in the display region and extending in a first direction; and a plurality of image signal lines formed in a second conductive layer on the first substrate in the display region and extending in a second direction intersecting with the first direction. The plurality of image signal lines include a first image signal line having a first bypass wiring arranged in the frame region and two first extension wirings connected to both ends of the first bypass wiring and extending in the second direction, and a second image signal line having a second bypass wiring arranged in the frame region and two second extension wirings connected to both ends of the second bypass wiring and extending in the second direction. In a plan view, the first image signal line and the second image signal line intersect with each other at the frame region.

BRIEF DESCRIPTIONS OF THE DRAWINGS

DESCRIPTIONS OF THE PREFERRED EMBODIMENTS

Figure 1:
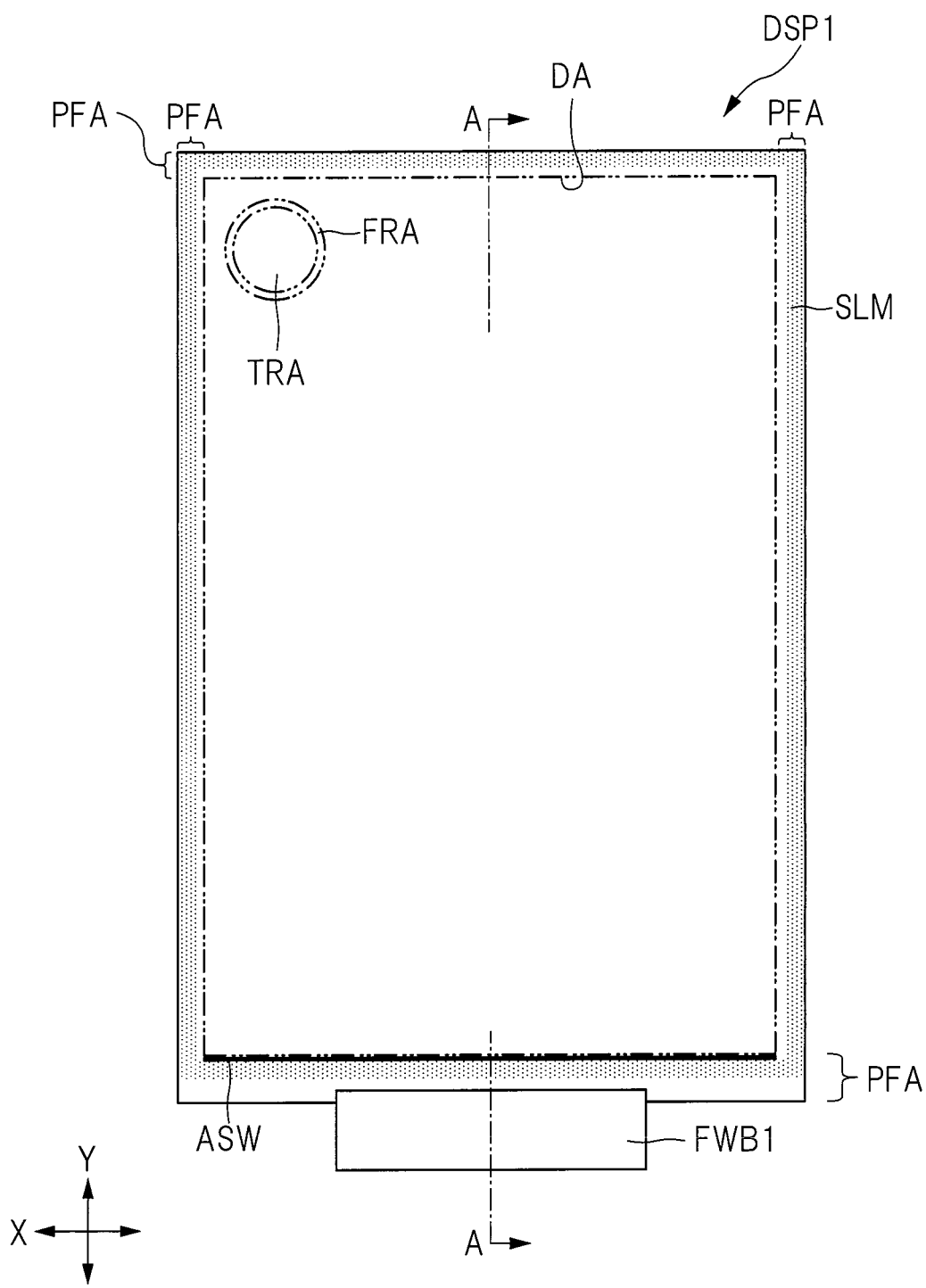
FIG. 1 is a plan view of a display surface side showing one example of a display apparatus according to one embodiment.

Each embodiment of the present invention will be described below with reference to drawings. Note that disclosure shows only one example, and appropriate modification with keeping the concept of the present invention which can be easily anticipated by those who are skilled in the art is obviously contained in the scope of the present invention. Also, in order to make the clear description, each drawing schematically shows a width, a thickness, a shape, and others of each portion in comparison with those of an actual aspect in some cases. However, the illustration is only one example, and does not limit the interpretation of the present invention. In the present specification and each drawing, similar elements to those described earlier for the already-described drawings are denoted with the same or similar reference characters, and detailed description for them is appropriately omitted in some cases.

In the following embodiments, as an example of a display apparatus, a liquid crystal display apparatus having a liquid crystal layer that is an electric optical layer will be exemplified and described. However, a technique described below is applicable to not only the liquid crystal display apparatus but also various modification examples. For example, the electric optical layer may be merely a layer including an element, an optical property of which is changed by application of electric energy, such as not only the liquid crystal layer but also an organic light emission element layer, an inorganic light emission element layer including a micro LED, a MEMS (Micro Electro Mechanical Systems) shutter, or an electrophoresis element layer.

The present application uses terms such as a wiring width, an arrangement pitch, an arrangement density and others of a plurality of wirings (scan signal lines or image signal lines described later) that are arranged so as to be adjacent to each other in a plan view in some cases. The above-described terms are defined as follows. The wiring width is a length of a wiring in a direction that is orthogonal to an extending direction (longitudinal direction) of the wiring. The arrangement pitch is a center-to-center distance between wirings that are adjacent to each other. The wiring density is an occupying ratio of a conductive pattern configuring the wiring per a unit area. The wiring density is defined by a relation between the wiring width and the wiring pitch (center-to-center distance). That is, when the wiring width is a constant, the wiring density is in inverse proportion to the wiring pitch. When the wiring pitch is a constant, the wiring density is in proportion to the wiring width. And, a gap distance of the wiring is a distance between the wirings that are adjacent to each other. Note that each of the plurality of wirings has a trapezoidal cross-sectional shape at a cross section in the width direction. In this case, the gap distance between the adjacent wirings implies a distance between bases of the trapezoids included in the respective adjacent wirings. The wiring width implies a length of the base of the trapezoid included in the wiring. In the present specification, a term "line and space" is used in some cases, and a line of the line and space implies the wiring width while the space of the same implies the gap distance.

The liquid crystal display apparatus is roughly classified into the following two types by an application direction of an electric field for use in change of alignments of liquid crystal molecules of a liquid crystal layer. That is, as the first classification, so-called vertical electric field mode that applies the electric field in a thickness direction (or an out-of-plane direction) of the display apparatus is cited. The vertical electric field mode includes, for example, a TN (Twisted Nematic) mode, a VA (Vertical Alignment) mode and others. As the second classification, so-called horizontal electric field mode that applies the electric field in a plane direction (or an in-plane direction) of the display apparatus is cited. The horizontal electric field mode includes, for example, an IPS (In-Plane Switching) mode, a FFS (Fringe Field Switching) mode that is one of the IPS modes and others. While a technique described below is applicable to both the vertical electric field mode and the horizontal electric field mode, a display apparatus of the horizontal electric field mode will be described as an example in the embodiments described below.

First Embodiment

<Configuration of Display Apparatus>

Figure 2:
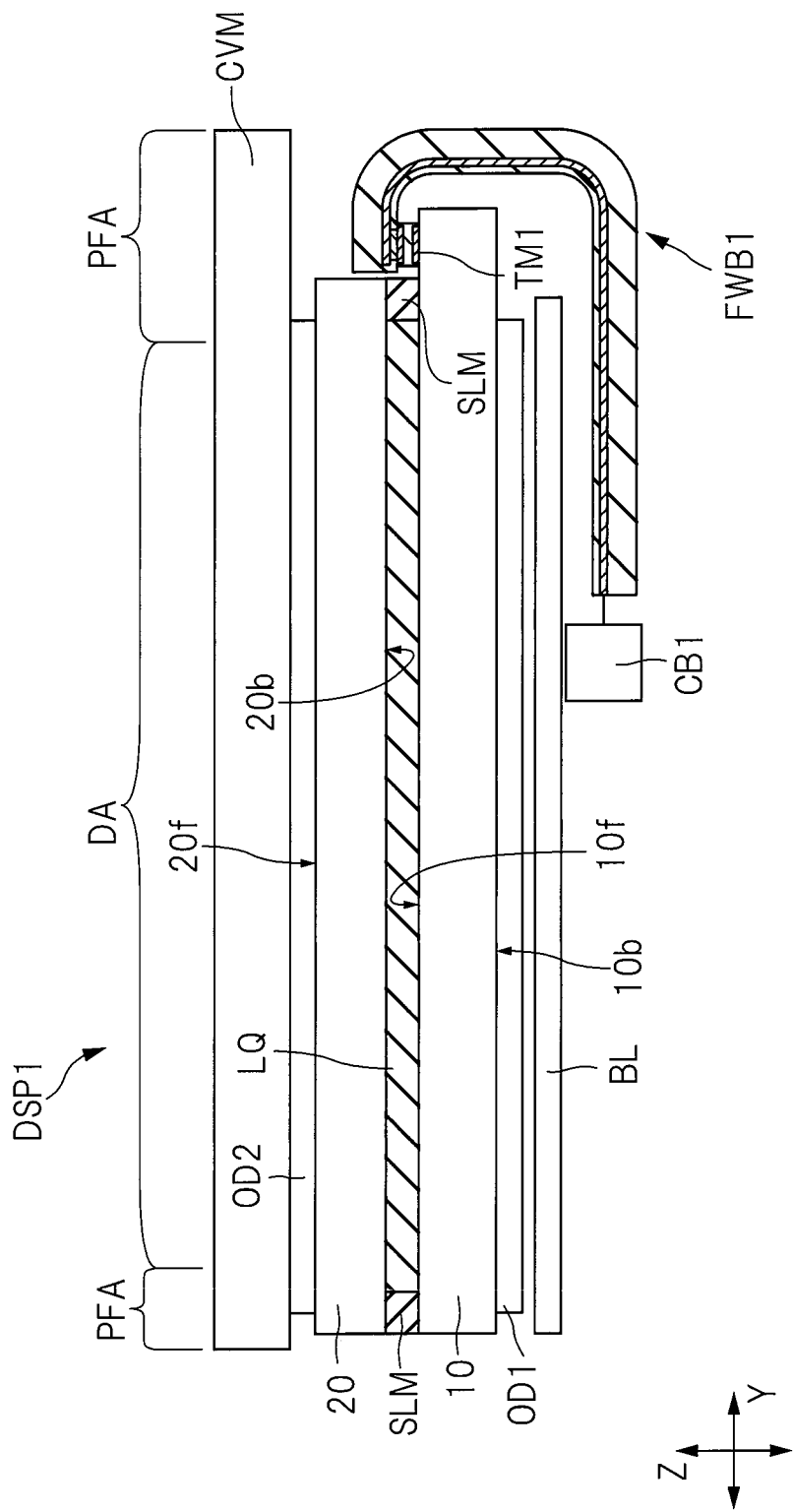
FIG. 2 is a cross-sectional view along a line A-A of FIG. 1.
Figure 3:
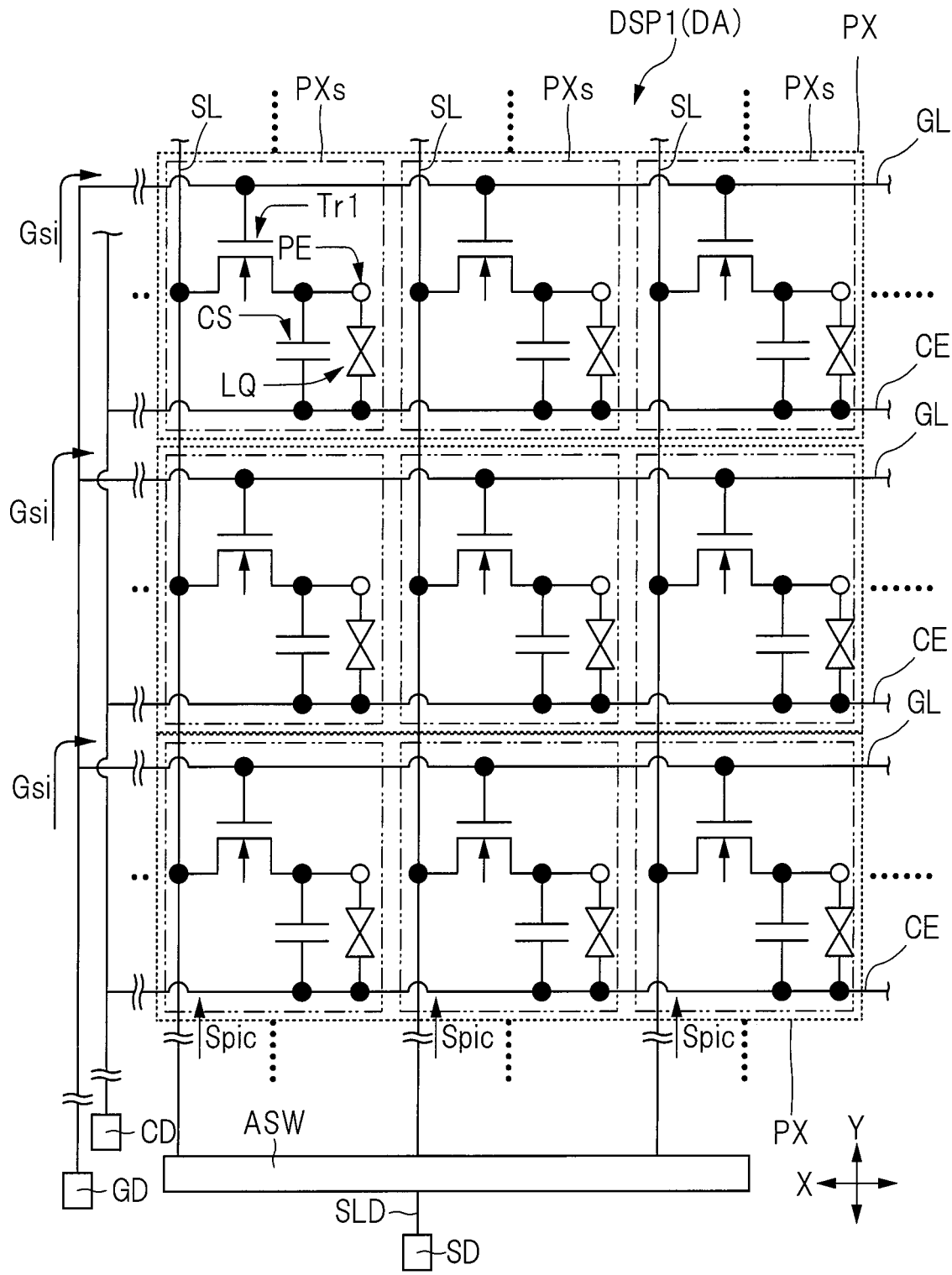
FIG. 3 is a circuit diagram showing an example of a circuit configuration around a pixel included in the display apparatus shown in FIG. 1.
Figure 4:
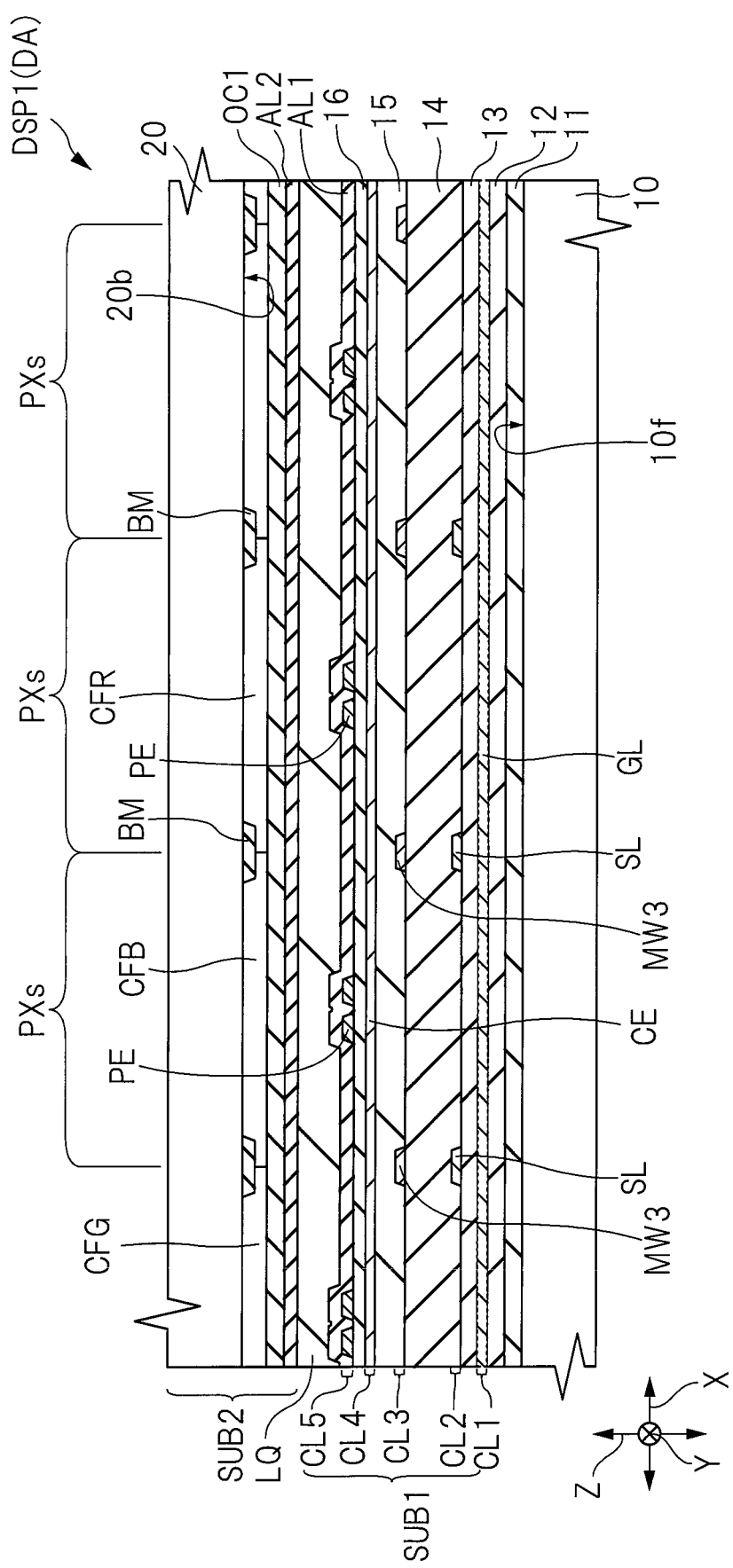
FIG. 4 is an enlarged cross-sectional view of the display region of the display apparatus shown in FIG. 2.

First, a configuration of the display apparatus will be described. FIG. 1 is a plan view of a display surface side showing one example of the display apparatus according to the present embodiment. In FIG. 1, each of a boarder between a display region DA and a peripheral region PFA, a boarder between the display region DA and a frame region FRA and a boarder between the frame region FRA and a transparent region TRA is illustrated by a dashed double-dotted line. In FIG. 1, a region where a sealing member SLM is arranged is illustrated by a dot pattern. FIG. 2 is a cross-sectional view along a line A-A of FIG. 1. Although not only a liquid crystal layer LQ but also a plurality of conductive layers and insulating layers exist between a substrate 10 and a substrate 20 as shown in FIG. 4 described later, illustration of them is omitted in FIG. 2. FIG. 3 is a circuit diagram showing an example of a circuit configuration around a pixel included in the display apparatus shown in FIG. 1. FIG. 4 is an enlarged cross-sectional view of the display region of the display apparatus shown in FIG. 2. In FIG. 4, in order to show an example of a positional relation between a scan signal line GL and an image signal line SL in a thickness direction (Z direction shown in FIG. 4) of the substrate 10, the scan signal line GL arranged on a cross section that is different from FIG. 4 is illustrated by a dotted line.

As shown in FIG. 1, a display apparatus DSP1 of the present embodiment has the display region DA. In the display region DA, an image is formed in accordance with an input signal supplied from outside. The display region DA is an effective region where the display apparatus DSP1 displays the image in a plan view in which a display surface is viewed. The display apparatus DSP1 has the peripheral region (non-display region) PFA around the display region DA in a plan view. While the display apparatus DSP1 has the peripheral region PFA around the display region DA, a display apparatus having the display region DA also at a circumferential portion exists as a modification example. A technique described below is also applicable to the display apparatus of the type having the display region DA also spreading to the circumferential portion of the display apparatus. The display region DA of the display apparatus DSP1 shown in FIG. 1 is quadrangular. However, the display region may have a shape other than the quadrangle, such as a polygonal shape or a circular shape. For example, each of four corners of the display region DA has a rounded shape in some cases.

The display apparatus DSP1 has the transparent region TRA and the frame region FRA inside the display region DA in a plan view. The transparent region TRA may be simply expressed as a first region TRA while the frame region FRA may be simply expressed as a second region FRA. The frame region FRA surrounds the transparent region TRA along an outer edge of the transparent region TRA in a plan view, and is between the display region DA and the transparent region TRA. The light is blocked in the frame region FRA by a light-blocking film BM, and therefore, the frame region FRA can be also described as a "light-blocking region" in other words. The transparent region TRA is a region where a component such as a camera attached to the display apparatus DSP1 is arranged. The transparent region TRA is formed so as to transmit visible light in order to allow the component such as the camera to be irradiated with the visible light. For example, on a substrate or a light-polarizing plate configuring the display apparatus, an opening (referred to as a through hole, a hole or a notch) is arranged in the transparent region TRA. Alternatively, in the transparent region TRA, a visible-light transmissive member (a glass substrate, an insulating film or others) is arranged but a light-locking member such as a metallic wiring is not arranged. Alternatively, the transparent region TRA is only required to have transparency that does not adversely affects a function of the component such as the camera. For example, a color filter formed in the display region may be not arranged in the transparent region, the wiring density of a black matrix formed in the transparent region TRA may be smaller (more loose) than the wiring density of a black matrix formed in the display region, the wiring density of the scan lines and image signal lines formed in the transparent region TRA may be smaller (more loose) than the wiring density of the scan signal lines and image signal lines formed in the display region. Note that a component such as not the camera but a microphone or a speaker may be arranged in the transparent region TRA or the frame region FRA in some cases.

As shown in FIG. 2, the display apparatus DSP1 has the substrate 10 and the substrate 20 that are bonded so as to be counter to each other through the liquid crystal layer LQ. The substrate 10 and the substrate 20 are counter to each other in the thickness direction (Z direction) of the display apparatus DSP1. The substrate 10 has a front surface (main surface, surface) 10f that is counter to the liquid crystal layer LQ (and the substrate 20). The substrate 20 has a back surface (main surface, surface) 20b that is counter to the front surface 10f (and the liquid crystal layer LQ) of the substrate 10. The substrate 10 is an array substrate in which a plurality of transistors (transistor elements) Tr1 (see FIG. 3) serving as switch elements (active elements) are arranged in an array form. The substrate 20 is a substrate formed on the display surface side. The substrate 20 can be described as a counter substrate in other words so as to imply a substrate that is counter to the array substrate.

The liquid crystal layer LQ is between the front surface 10f of the substrate 10 and the back surface 20d of the substrate 20. The liquid crystal layer LQ is an electric optical layer that controls a transmissive state to the visible light. This layer has a function that modulates the light passing the liquid crystal layer by controlling a state of the electric field formed around the liquid crystal layer LQ through the switching element. The display region DA of the substrate 10 and the substrate 20 overlaps the liquid crystal layer LQ as shown in FIG. 2.

The substrate 10 and the substrate 20 are bonded to each other through a sealing member (bonding member) SLM. As shown in FIG. 1, the sealing member SLM is arranged in the peripheral region PFA so as to surround the display region DA. As shown in FIG. 2, the liquid crystal layer LQ is inside the sealing member SLM. The sealing member SLM plays a role of a sealing substance that seals liquid crystal between the substrate 10 and the substrate 20. Besides, the sealing member SLM plays a role of a bonding member that bonds the substrate 10 and the substrate 20.

The display apparatus DSP1 has an optical element OD1 and an optical element OD2. The optical element OD1 is arranged between the substrate 10 and a back light unit BL. The optical element OD2 is arranged on the display surface side of the substrate 20, that is, on an opposite side of the substrate 10 across the substrate 20. Each of the optical element OD1 and the optical element OD2 includes at least a polarizing plate, and may include a phase difference plate if needed. As described above, in the transparent region TRA, the optical element OD1 and the optical element OD2 that may be possibly an obstructive factor of the transparency are not formed in order to enhance the transparency. More specifically, in each of the optical elements OD1 and OD2, the opening (also referred to as the hole or notch) is formed along the shape of the transparent region TRA. However, as long as the one not significantly inhibiting the function of the component such as the camera, the optical elements OD1 and OD2 may be formed in the transparent region TRA.

The display apparatus DSP1 has a covering member CVM (see FIG. 2) that covers the display surface side of the substrate 20. The covering member CVM is counter to the front surface (surface) 10f that is an opposite side of the back surface (surface) 20b of the substrate 20. The substrate 20 is between the covering member CVM and the substrate 10 in the Z direction. The covering member CVM is a protecting member that protects the substrates 10 and 20 and the optical element OD2, and is arranged on the display surface side of the display apparatus DSP1. However, as a modification example of the present embodiment, the covering member CVM does not exist in some cases.

Each of the substrates 10 and 20 is a transparent plate material having the visible-light transmissivity (that is a property allowing the visible light to transmit). As the substrate that is the transparent plate material, a glass substrate can be exemplified. As a constituent material of each of the substrates 10 and 20, a resin material (a visible-light transmissive resin material) containing a polymer such as polyimide, polyamide, polycarbonate, or polyester can be used. In the case of the substrate made of the resin material such as polyimide, the substrate has flexibility. When the substrate 10 has flexibility, a part (such as the peripheral region PFA) of the substrate 10 can be curved or bent. When the substrate 10 or the substrate 20 has flexibility, an area of the peripheral region PFA in a plan view can be decreased. In this case, an occupancy of the effective display region in a plan view can be increased.

As shown in FIG. 3, a plurality of pixels PX are arranged in the display region DA. In an example shown in FIG. 3, each of the plurality of pixels PX has a plurality of sub pixels PXs. The plurality of sub pixels PXs include, for example, sub pixels PXs for red color, blue color and green color, and a color image can be displayed by controlling tones of the plurality of sub pixels PXs. As the number of types of the sub pixels PXs configuring one pixel PX, not only the three types exemplified in FIG. 3 but also various modification examples are applicable.

Each of the plurality of sub pixels PXs has the transistor Tr1 that is a switching element controlling turning ON/OFF of the electric field applied to the liquid crystal layer LQ. The transistor Tr1 controls an operation of the sub pixel PXs. As described later, the transistor Tr1 is a thin film transistor (TFT) formed on the substrate 10.

As shown in FIG. 3, the display apparatus DSP1 has a plurality of scan signal lines GL extending in an X direction in the display region DA and a plurality of image signal lines SL extending in a Y direction that intersects (in FIG. 3, orthogonally) with the X direction in the display region DA. The scan signal line GL is a gate line connected to a gate of the transistor Tr1. The image signal line SL is a source line connected to a source of the transistor Tr1. Each of the plurality of scan signal lines GL extends in the X direction, and is arranged so as to interpose, for example, an equal distance therebetween in the Y direction. Each of the plurality of image signal lines SL extends in the Y direction, and is arranged so as to interpose, for example, an equal distance therebetween in the X direction.

Each of the plurality of scan signal lines GL is connected to a scan driving circuit (gate driving circuit) GD. A scan signal Gsi that is output from the scan driving circuit GD is input to the gate of the transistor Tr1 through the scan signal line GL. Each of the plurality of image signal lines SL is connected to an image-signal driving circuit SD. An image signal Spic that is output from the image-signal driving circuit SD is input to the source of the transistor Tr1 through the image signal line SL.

In the example shown in FIG. 3, each of the plurality of image signal lines SL is connected to the image-signal driving circuit SD through a signal selecting circuit ASW including the switch element and a wiring SLD connected to the signal selecting circuit ASW. The signal selecting circuit ASW is a demultiplexer that selectively outputs a signal that is input from one input route to a plurality of output routes. The signal selecting circuit ASW has a function that, for example, sequentially receives the input signal for the red color, the input signal for the green color and the input signal for the blue color from the wiring SLD shown in FIG. 3 and sequentially outputs these input signals to the corresponding sub pixels PXs. The wiring SLD is arranged outside the display region DA shown in FIG. 1. When the signal selecting circuit ASW is interposed between the wiring SLD and the image signal line SL, the number of the wirings SLD can be reduced. For example, in the above-described case, the number of the wirings SLD may be ⅓ times the number of the image signal lines SL.

Each of the plurality of image signal lines SL is connected to a pixel electrode PE through the transistor Tr1. More specifically, the image signal line SL is connected to the source of the transistor Tr1, and the pixel electrode PE is connected to a drain of the transistor Tr1. When the transistor Tr1 is turned ON, the image signal Spic is supplied from the image signal line SL to the pixel electrode PE. The pixel electrode PE is connected to a common electrode CE through a dielectric layer (a capacity element CS shown in FIG. 3). To the common electrode CE, a fixed potential is supplied from a common-potential supplying circuit CD. The fixed potential that is supplied to the common electrode CE is a common potential among the plurality of sub pixels PXs. In a display period, the electric field is formed in each sub pixel PXs in accordance with difference between the potential supplied to the common electrode CE and the potential supplied to the pixel electrode PE, and the liquid crystal molecules contained in the liquid crystal layer LQ are driven by this electric field.

In the present embodiment, potentials having opposite polarities to each other are alternately applied to each of the plurality of image signal lines SL in each display frame, although the details will be described later. In one display frame, a potential having a positive polarity is applied to some of the plurality of image signal lines SL while a potential having a negative polarity is applied to the other of the same. As described above, a driving mode that alternately inputs the positive potential and the negative potential for each column of the image signal line SL is preferable in a viewpoint in which a driving voltage of the image-signal driving circuit SD can be reduced.

Each of the scan driving circuit GD, the image-signal driving circuit SD and the common-potential supplying circuit CD shown in FIG. 3 is a circuit formed on, for example, the peripheral region PFA shown in FIG. 1 or a driving IC chip CB1 (see FIG. 2) mounted on a wiring substrate FWB1 connected to the peripheral region PFA. However, as a modification example, each of the scan driving circuit GD, the image-signal driving circuit SD and the common-potential supplying circuit CD may be a circuit formed on the substrate 10 in some cases. The wiring substrate FWB1 is connected to a plurality of terminal TM1 formed on the substrate 10, and is electrically connected to a circuit formed on the substrate 10 through the terminals TM1.

As shown in FIG. 4, a plurality of conductive layers CL1 to CL5, a plurality of insulating films 11 to 16 and an alignment film AL1 are formed between the substrate 10 and the liquid crystal layer LQ. The plurality of conductive layers CL1 to CL5, the plurality of insulating films 11 to 16 and the alignment film AL1 are formed on the front surface 10f of the substrate 10. And, a light-blocking film BM, color filters CFR, CFG and CFB, an insulating film OC1 and an alignment film AL2 are formed between the substrate 20 and the liquid crystal layer LQ. The light-blocking film BM, the color filters CFR, CFG and CFB, the insulating film OC1 and the alignment film AL2 are formed on the back surface 20b of the substrate 20.

On each of the conductive layers CL1, CL2 and CL3 shown in FIG. 4, a metallic conductive pattern (metallic wiring) having a light-blocking effect is formed. The conductive layers CL1 and CL3 include a metallic film made of, for example, a metal such as molybdenum (Mo) or tungsten (W) or alloy of this metal. The conductive pattern of the conductive layer CL2 includes, for example, a metallic film having a multi-layered structure such as a layered film in which an aluminum (Al) film is sandwiched by a titanium (Ti) film, a titanium nitride (TiN) film or others. Each of the conductive layers CL4 and CL5 mainly contains, for example, a conductive oxide material (transparent conductive material) such as ITO (Indium Tin Oxide), IZO (Indium Zinc Oxide) or others.

An insulating layer is interposed among the conductive layers CL1 to CL5. The insulating film 11 and the insulating film 12 are interposed between the conductive layer CL1 and the substrate 10. The insulating film 13 is interposed between the conductive layer CL1 and the conductive layer CL2. The insulating film 14 is interposed between the conductive layer CL3 and the conductive layer CL4. The insulating film 15 is interposed between the conductive layer CL4 and the conductive layer CL5. The alignment film AL1 is interposed between the conductive layer CL5 and the liquid crystal layer LQ. Each of the insulating films 11, 12, 13 and 16 is an inorganic insulating film. As the inorganic insulating film, for example, a silicon nitride (SiN) film, a silicon oxide (SiO) film, an aluminum oxide (AlOx) film or a layered film of these films can be exemplified. Each of the insulating films 14 and 15 is an organic insulating film. When the insulating film made of the organic material is formed to be thicker than the insulating film made of the inorganic material, an upper surface (front surface) can be flattened. Each of the insulating films 14 and 15 is used as a flattening film that flattens asperity of the conductive pattern formed on a base layer. Therefore, each thickness of the insulating film 14 and the insulating film 15 is thicker than each thickness of the insulating films 11, 12 and 13 that are the inorganic insulating films. As an example of the organic insulating film, an acrylic photosensitive resin or others can be exemplified. However, the insulating film 15 is not limited to the organic insulating film, but may be the inorganic insulating film. When the insulating film 15 is the inorganic insulating film, an inorganic insulating film that is thicker than each thickness of the insulating films 11, 12 and 13 or a multi-layered film of the inorganic insulating films is preferably used.

Each of the plurality of scan signal lines GL is formed in the conductive layer CL1 on the substrate 10. The insulating films 11 and 12 are layered on the substrate 10, and the scan signal line GL is formed on the insulating film 12. Each of the plurality of image signal lines SL is formed in the conductive layer CL2 on the substrate 10. The insulating films 11, 12 and 13 are layered on the substrate 10, and the image signal line SL is formed on the insulating film 13.

The semiconductive layer of the transistor (transistor element) Tr1 shown in FIG. 3 is formed between the insulating films 11 and 12. The semiconductive layer is on a cross section that is different from FIG. 4, and therefore, FIG. 4 does not show the semiconductive layer. A source region of the semiconductive layer is electrically connected to the image signal line SL formed in the conductive layer CL2. A drain region of the semiconductive layer is electrically connected to the pixel electrode PE formed in the conductive layer CL5. In a plan view, the scan signal line GL extends in a portion between the source region and the drain region of the semiconductive layer. The scan signal line GL overlaps a channel region of the semiconductive layer, and functions as a gate electrode of the transistor Tr1. The insulating film 12 interposed between the channel region and the scan signal line GL functions as a gate insulating film. A TFT having a structure in which the gate electrode is arranged on an upper side of the channel region of the transistor Tr1 as described above in the example is called top gate method. However, the TFT method includes various modification examples, and, for example, a bottom gate method in which the gate electrode is arranged on a lower side of the channel region may be used. Alternatively, a method in which the gate electrode is arranged on both the upper and lower sides of the channel region is also applicable.

A wiring MW3 is arranged in the conductive layer CL3. The wiring MW3 is a metallic wiring made of the same metal as those of the scan signal line GL and the image signal line SL. The wiring MW3 is arranged at a position overlapping the image signal line SL in the thickness direction (Z direction). The wiring MW3 is electrically connected to the common electrode CE formed in the conductive layer CL4. In this case, the wiring MW3 can be used as a wiring that supplies the potential to the common electrode CE. Alternatively, when the display apparatus DSP1 has a touch panel function, the wiring MW3 is used as a signal transmission route through which a driving signal or a detection signal for use in detection of a touch position is transmitted.

As described later, in the case of the present embodiment, some of the plurality of image signal lines SL intersect with each other in the frame region FRA. The conductive layer CL3 is used as a wiring layer for use in allowing the image signal lines SL to intersect with each other. In other words, a bypass wiring portion of one image signal line SL of the intersecting image signal lines SL is formed in the conductive layer CL3.

The common electrode CE is formed in the conductive layer CL4. The common electrode CE is formed on the insulating film 15 that is the flattening film. FIG. 4 shows one common electrode CE. However, in the display region DA shown in FIG. 1, a plurality of common electrodes CE may be arranged so as to separate from each other. As described above, to the common electrode CE, a potential that is common among the plurality of sub pixels PXs is supplied. Therefore, as shown in FIG. 4, the common electrode CE may be arranged over the plurality of sub pixels PXs.

The plurality of pixel electrodes PE are formed in the conductive layer CL5. The insulating film 16 that is the inorganic insulating film is interposed between the conductive layer CL5 where the pixel electrode PE is formed and the conductive layer CL4 where the common electrode CE is formed. This insulating film 16 functions as a dielectric layer where the capacity element CS shown in FIG. 3 is formed.

The plurality of pixel electrodes PE are covered by the alignment film AL1. The alignment film AL1 is an organic insulating film having a function that equalizes initial alignments of liquid crystal molecules contained the liquid crystal layer LQ, and is made of, for example, a polyimide resin. The alignment film AL1 is in contact with the liquid crystal layer LQ.

As shown in FIG. 4, the light-blocking film BM, the color filters CFR, CFG and CFB, the insulating film OC1 and the alignment film AL2 are formed on the back surface (main surface, surface) 20*b* of the substrate 20.

The color filters CFR, CFG and CFB are formed on a portion closer to the back surface 20*b* that is counter to the substrate 10. In the example shown in FIG. 3, the color filters CFR, CFG and CFB for three colors that are red (R), green (G) and blue (B) are periodically arranged. In a color display apparatus, a color image is displayed while, for example, pixels of the three colors that are the red (R), the green (G) and the blue (B) are grouped as one set. The plurality of color filters CFR, CFG and CFB of the substrate 20 are arranged at positions that are counter to the respective pixels PX (see FIG. 1) each having the pixel electrode PE formed in the substrate 10. Note that types of the color filters are not limited to the three colors that are the red (R), the green (G) and the blue (B).

At each border among the color filters CFR, CFG and CFB of the respective colors, the light-blocking film BM is arranged. The light-blocking film BM is called black matrix, and is made of, for example, a black resin or a low-reflective metal. The light-blocking film BM is shaped into, for example, a grid form in a plan view. In other words, the light-blocking film BM extends in the X direction and the Y direction. More specifically, the light-blocking film BM has a plurality of portions extending in the Y direction and a plurality of portions extending in the X direction intersecting with the Y direction. When each pixel PX is sectioned by the black matrix, light leakage and color mixture can be suppressed.

The light-blocking film BM overlaps the scan signal line GL, the image signal line SL and the wiring MW3 that are the metallic wirings in the display region DA. Since the metallic wirings each having the light-blocking property are arranged at the positions overlapping the light-blocking film BM, the metallic wirings are difficult to be visually observed on a display screen. On the other hand, at least parts of the common electrode CE and the pixel electrode PE are arranged at positions not overlapping the light-blocking film BM. Each of the common electrode CE and the pixel electrode PE is made of a visible-light transmissive conductive material. Therefore, although the common electrode CE and the pixel electrode PE are arranged at the positions not overlapping the light-blocking film BM, the visible light is not blocked by the common electrode CE and the pixel electrode PE in each sub pixel PXs.

The light-blocking film BM is also formed in the peripheral region PFA (see FIG. 1) of the substrate 20. The peripheral region PFA overlaps the light-blocking film BM. The display region DA is defined as an inner region of the peripheral region PFA. The peripheral region PFA is a region overlapping the light-blocking film BM that blocks the light that is emitted from a backlight unit (optical source) BL shown in FIG. 2. While the light-blocking film BM is also formed inside the display region DA, a plurality of openings are formed in the light-blocking film BM of the display region DA. Generally, an end of the opening formed on a portion that is the closest to an edge side among the openings from which the color filters are exposed is defined as the boarder between the display region DA and the peripheral region PFA.

The insulating film OC1 shown in FIG. 4 covers the color filters CFR, CFG and CFB. The insulating film OC1 functions as a protection film that prevents impurities from diffusing from the color filters to the liquid crystal layer. The insulating film OC1 is an organic insulating film made of, for example, an acrylic photosensitive resin or others.

The insulating film OC1 is covered by an alignment film AL2. The alignment film AL2 is an organic insulating film having a function that equalizes the initial alignments of the liquid crystal molecules contained in the liquid crystal layer LQ, and is made of, for example, a polyimide resin. The alignment film AL2 is in contact with the liquid crystal layer LQ.

<Signal Selecting Circuit>

Figure 5:
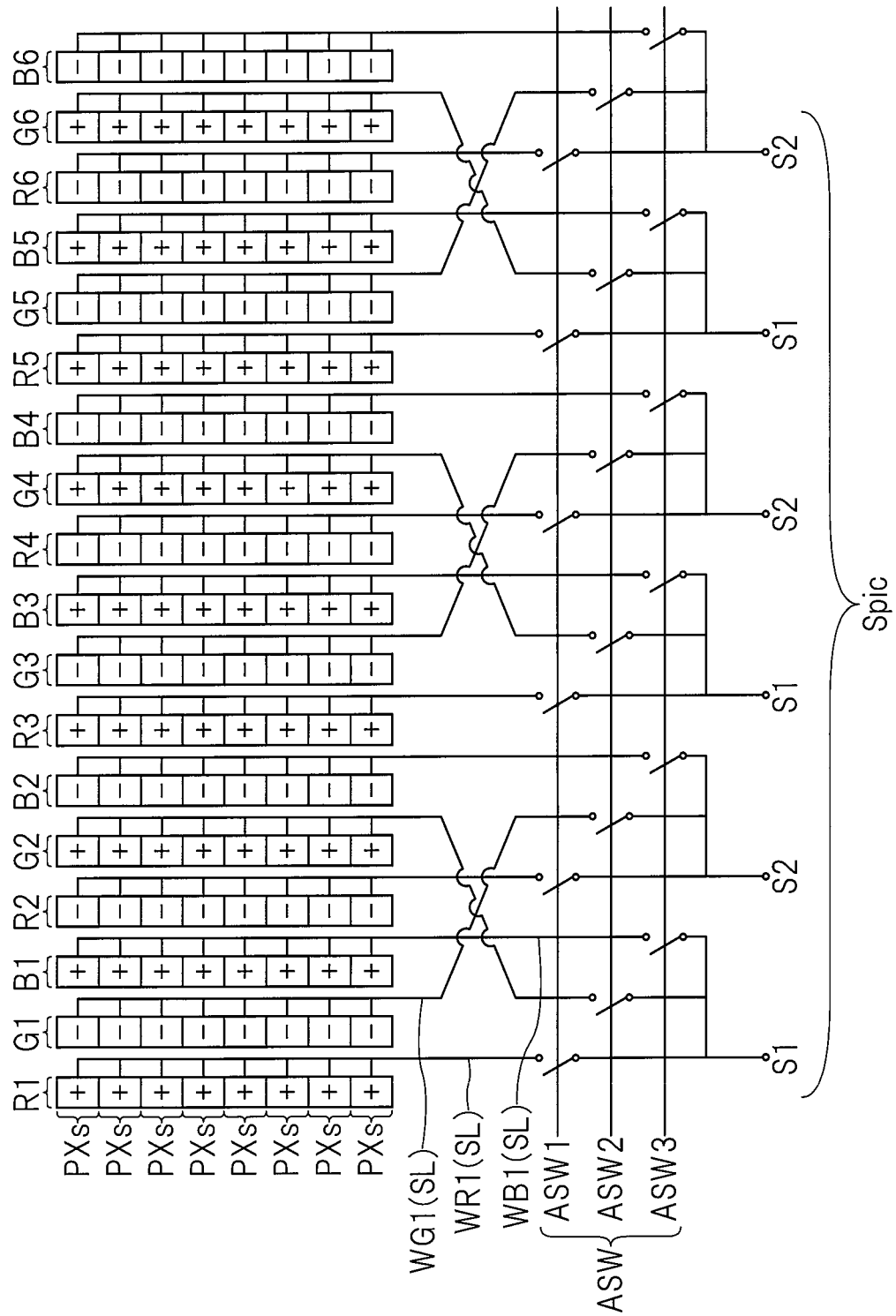
FIG. 5 is an explanatory diagram showing a conceptual illustration of input of an image signal to each of a plurality of sub pixels shown in FIG. 3.
Figure 6:
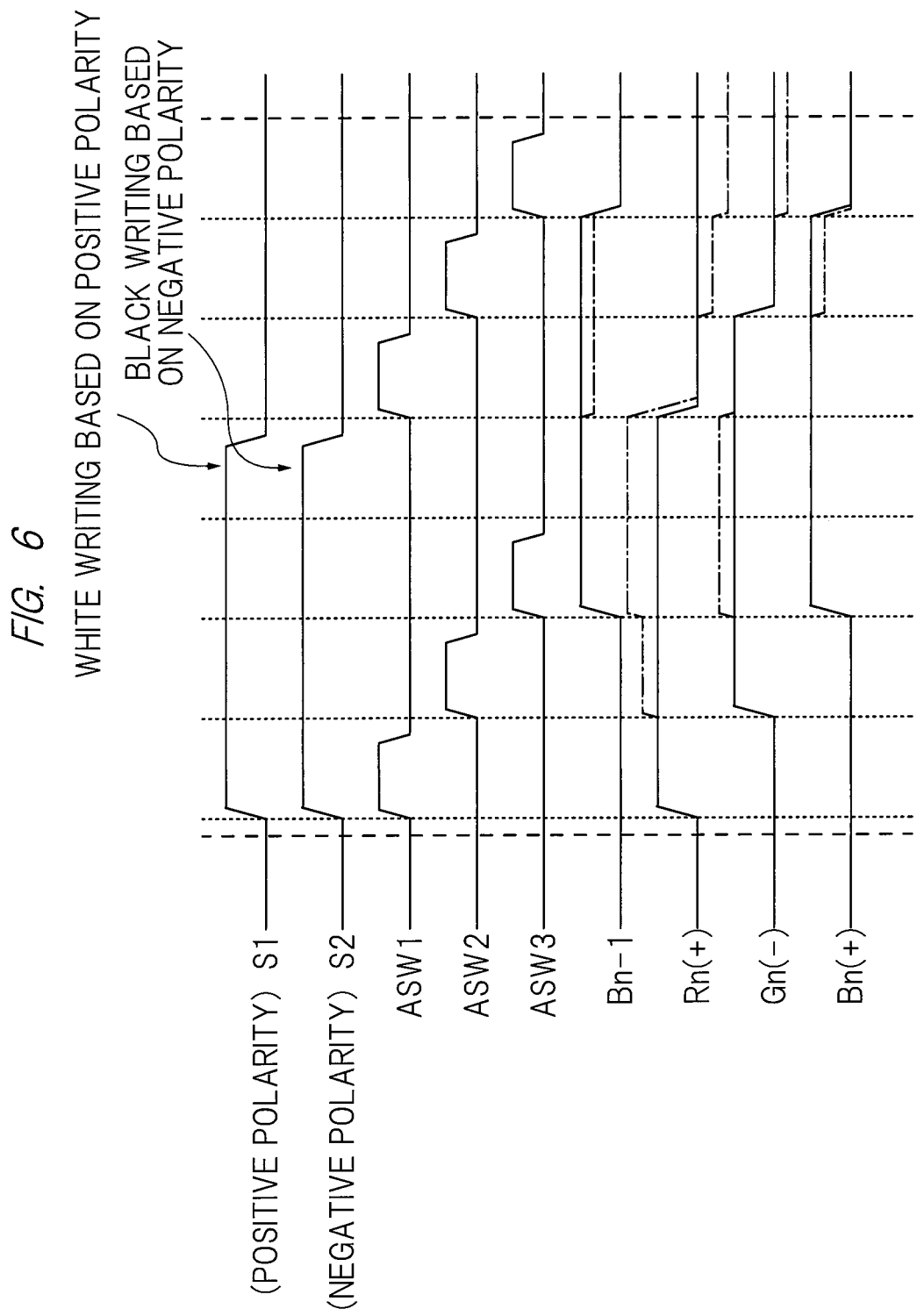
FIG. 6 is a chart showing one example of a timing chart of the input of the image signal to each of the plurality of sub pixels shown in FIG. 3.

Next, an input method of the image signal Spic using the signal selecting circuit ASW shown in FIG. 3 will be described. FIG. 5 is an explanatory diagram showing a conceptual illustration of input of an image signal to each of the plurality of sub pixels shown in FIG. 3. A symbol "+" or "−" shown with each of the plurality of sub pixels PXs in FIG. 5 represents a polarity of the input signal of each sub pixel PXs. FIG. 6 is a chart showing one example of a timing chart of the input of the image signal to each of the plurality of sub pixels shown in FIG. 3.

As shown in FIG. 5, the signal selecting circuit ASW includes switches (signal-line driving circuits) ASW1, ASW2 and ASW3. As shown in FIG. 6, in the signal selecting circuit ASW, a pulse signal that is an ON signal or an OFF signal is sequentially input to the switches ASW1, ASW2 and ASW3. For example, when the pulse signal that is the ON signal is input to the switch ASW1, a red-color image signal Spic is supplied to each of a plurality of red-color sub pixels PXs shown in FIG. 5. When the ON signal is input to the switch ASW2, a green-color image signal Spic is supplied to each of a plurality of green-color sub pixels PXs. When the ON signal is input to the switch ASW3, a blue-color image signal Spic is supplied to each of a plurality of blue-color sub pixels PXs. In an example shown in FIG. 6, the ON signal is sequentially input to each of the switches ASW1, ASW2 and ASW3, and then, the OFF signal is sequentially input to each of the switches ASW1, ASW2 and ASW3. When the ON signal is input to the switch ASW1, the image signal is not supplied to columns Gn and Bn.

Note that the ON signal is a signal that turns ON any of the switches ASW1, ASW2 and ASW3. The image signal Spic that is a writing signal is supplied to the image signal line SL that is connected to any of the switches ASW1, ASW2 and ASW3 to which this ON signal is supplied. Hereinafter, when the present specification describes that "the ON signal is applied at the same timing" or that "the ON signal is applied at a different timing", these descriptions can be also read so that "the writing signal is transmitted at the same timing" or that "the writing signal is transmitted at a different timing".

To a column Rn shown in FIG. 6, a voltage is applied in a period from the application of the ON signal to the switch ASW1 to the application of the OFF signal thereto. To a column Gn, a voltage is applied in a period from the application of the ON signal to the switch ASW2 to the application of the OFF signal thereto. To each of a column Bn−1 and a column Bn, a voltage is applied in a period from the application of the ON signal to the switch ASW1 to the application of the OFF signal thereto.

In the case of the present embodiment, the signals having the different polarities from one another are suppled as the image signals Spic (see FIG. 5). In the example shown in FIGS. 5 and 6, a signal S1 corresponds to the image signal Spic having the positive polarity, and a signal S2 corresponds to the image signal Spic having the negative polarity. In the plurality of sub pixels PXs of the example shown in FIG. 5, the plurality of sub pixels are arranged in each of the columns R1, G1, B1, R2, G2, B2, . . . R6, G6 and B6. To the sub pixels PXs on the same column, the image signal Spic having the same polarity is input. For example, in FIG. 5, the positive-polarity signal is input to the column R1 and the column B1, and the negative-polarity signal is input to the column G1 and the column R2.

The polarity of the signal applied to each of the plurality of sub pixels PXs is inversed for each unit display frame. For example, when the positive-polarity signal is input to the column R1 and the column B1 shown in FIG. 5 while the negative-polarity signal is input to the column G1 and the column R2 in the first display frame, the negative-polarity signal is input to the column R1 and the column B1 while the positive-polarity signal is input to the column G1 and the column R2 in the second display frame following the first display frame.

<Details of Portion Around Transparent Region TRA>

Figure 7:
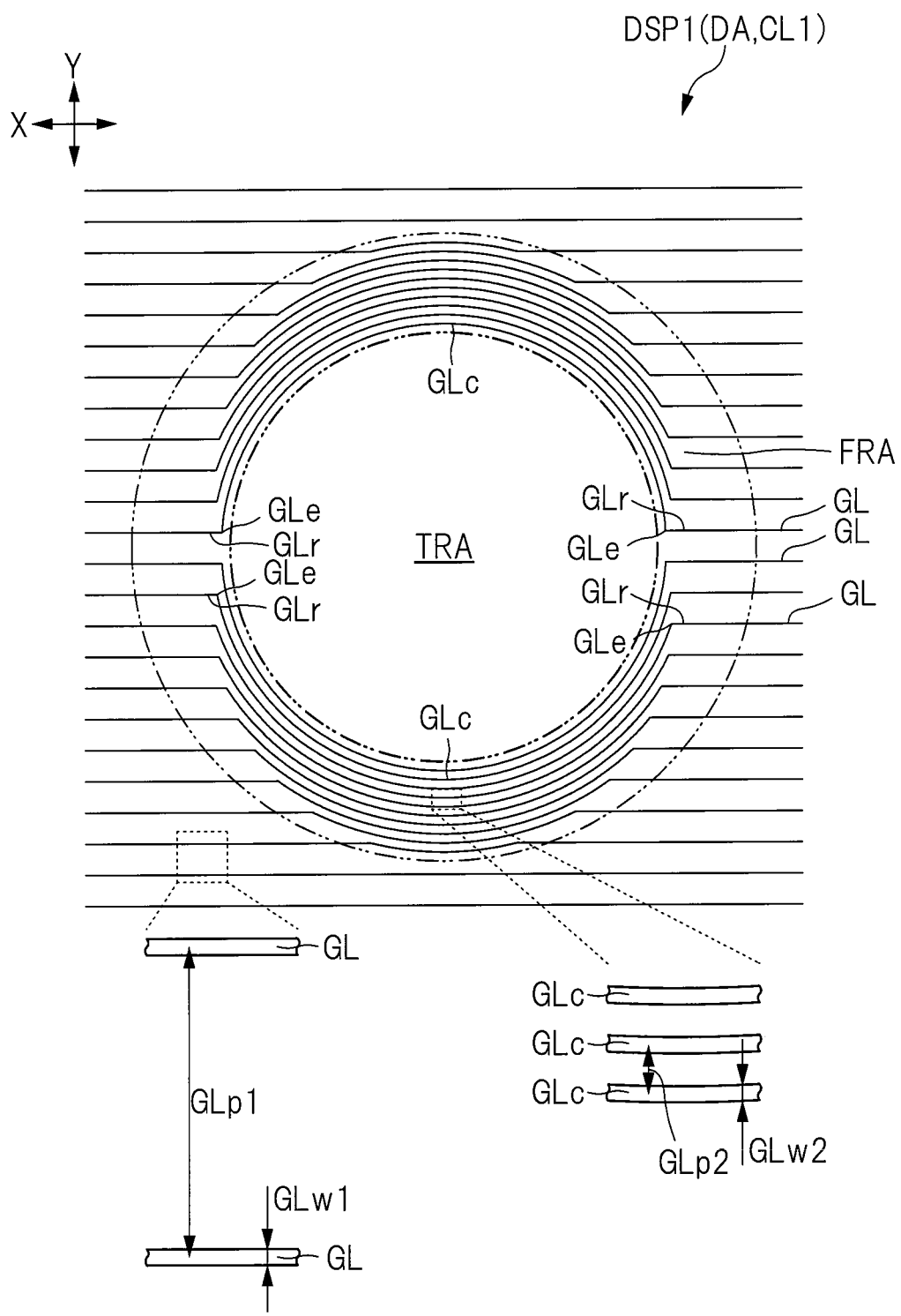
FIG. 7 is an enlarged plan view of a first conductive layer around a transparent region shown in FIG. 1.
Figure 8:
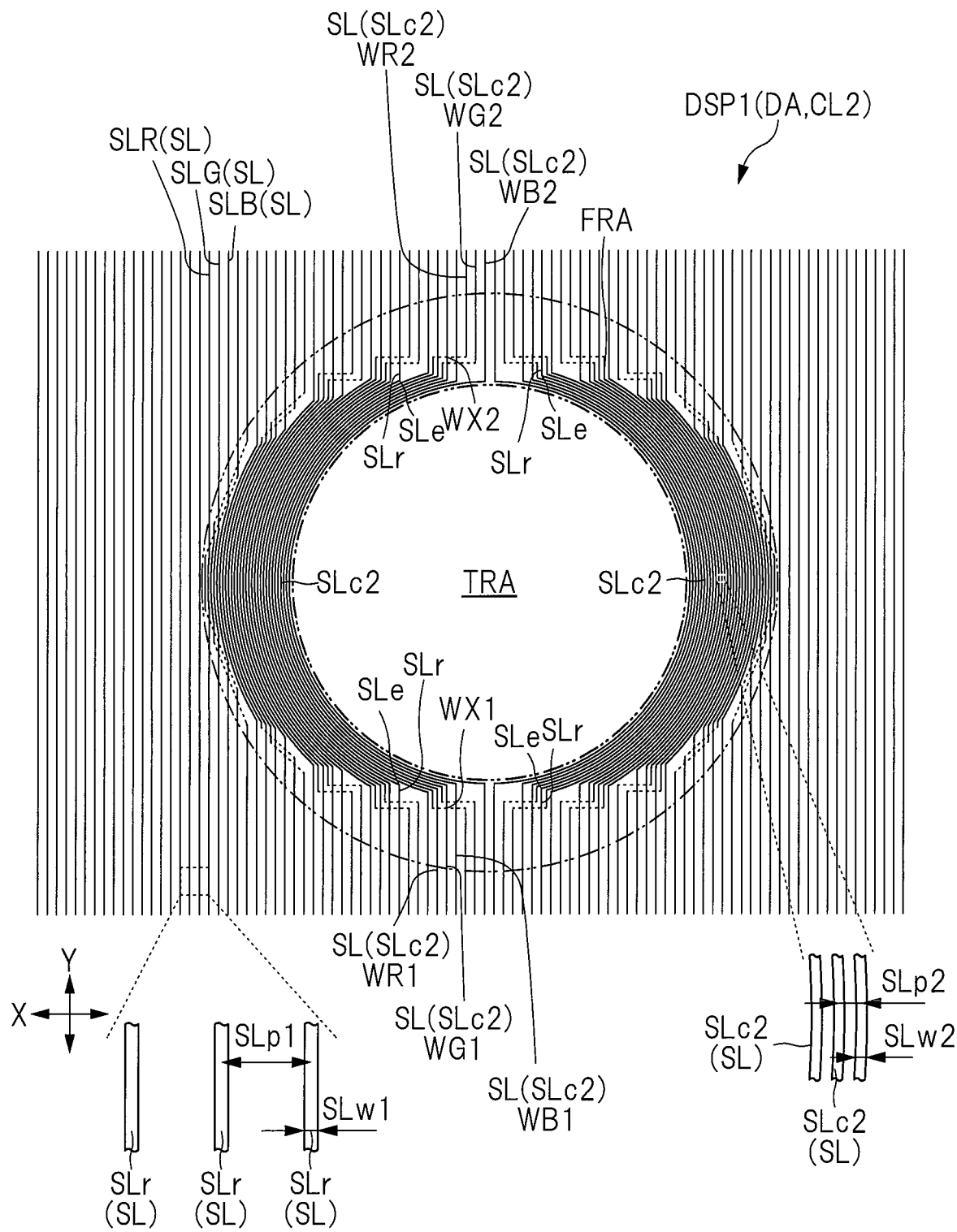
FIG. 8 is an enlarged plan view of a second conductive layer around the transparent region shown in FIG. 1.

Next, a portion around the transparent region TRA shown in FIG. 1 will be described in detail. FIG. 7 is an enlarged plan view of a first conductive layer around the transparent region shown in FIG. 1. FIG. 8 is an enlarged plan view of a second conductive layer around the transparent region shown in FIG. 1. FIG. 8 is a plan view of the conductive layer CL2 so that a wiring formed in the conductive layer CL3 (see FIG. 4) is shown by a dotted line.

As shown in FIG. 7, each of the plurality of scan signal lines GL extends inside the display region DA in the X direction. As shown in FIG. 8, each of the plurality of image signal lines SL extends inside the display region DA in the Y direction. As shown in FIG. 3, one sub pixel PXs is formed at one intersection at which the scan signal line GL and the image signal line SL intersect with each other.

Here, when the transparent region TRA is arranged inside the display region DA as shown in FIG. 7, the transparent region TRA is arranged on an extension line of an extension wiring portion (scan-signal extension wiring portion) GLr of each of some of the plurality of scan signal lines GL linearly extending in the X direction. Similarly, when the transparent region TRA is arranged inside the display region DA as shown in FIG. 8, the transparent region TRA is arranged on an extension line of an extension wiring portion (image-signal extension wiring portion) SLr of each of some of the plurality of image signal lines SL linearly extending in the Y direction. However, in order to improve the visible-light transmissivity of the transparent region TRA, it is preferable to arrange the signal line GL and the image signal line SL that are the metallic wirings so as not to overlap the transparent region TRA. In the present specification, a part extending in one direction in each of the signal line GL and the image signal line SL is named as an extension wiring portion, and a part bypassing so as to avoid the transparent region TRA is named as a bypass wiring portion. However, regarding the naming, the "wiring portion" may be simply described as "wiring". For example, even when the "extension wiring portion" is simply described as the "extension wiring" while the "bypass wiring portion" is simply described as the "bypass wiring", the implication is the same.

In order to use the region around the transparent region TRA as the display region, it is necessary to avoid the disconnections of the scan signal line GL and the image signal line SL near the transparent region TRA. In the case of the display apparatus DSP1 of the present embodiment, as shown in FIG. 7, some of the plurality of scan signal lines GL have a plurality of extension wiring portions (scan-signal extension wiring portions) GLr which are arranged in the display region DA and which extend in the X direction and a plurality of bypass wiring portions GLc which are arranged in the frame region FRA of the conductive layer CL1 and both ends of which are connected to the plurality of extension wiring portions GLr. The bypass wiring portion GLc is a wiring that bypasses the transmission route for the scan signal so as to run along the edge of the transparent region TRA. In the present specification, the bypass wiring portion GLc configuring the transmission route for the scan signal is referred to as scan-signal bypass wiring portion in some cases. The bypass wiring portion GLc is formed in the conductive layer CL1 that is the first conductive layer, and therefore, is referred to as first-layer bypass wiring portion in the present specification in some cases. The bypass wiring portion GLc extends in a different direction from the X direction that is the extending direction of the extension wiring portion GLr. In an example shown in FIG. 7, each of the plurality of bypass wiring portions GLc extends in an arc form along the edge of the transparent region TRA making a circle. Each of the plurality of bypass wiring portions GLc has two ends GLe, and the extension wiring portion GLr is connected to each of the two ends GLe.

In the case of the display apparatus DSP1, as shown in FIG. 8, some of the plurality of image signal lines SL have a plurality of extension wiring portions (image-signal extension wiring portions) SLr which are arranged in the display region DA and which extend in the Y direction and a plurality of bypass wiring portions SLc2 which are arranged in the frame region FRA of the conductive layer CL2 and both ends of which are connected to the plurality of extension wiring portions SLr. The bypass wiring portion SLc2 is a wiring that bypasses the transmission route for the image signal so as to run along the edge of the transparent region TRA. The bypass wiring portion SLc2 configuring the transmission route for the image signal is referred to as image-signal bypass wiring portion in the present specification in some cases. The bypass wiring portion SLc2 is formed in the conductive layer CL2 that is the second conductive layer, and therefore, is referred to as second-layer bypass wiring portion in the present specification in some cases. The bypass wiring portion SLc2 extends in a different direction from the Y direction that is the extending direction of the extension wiring portion SLr. In an example shown in FIG. 8, each of the plurality of bypass wiring portions SLc2 extends in an arc form along the edge of the transparent region TRA making a circle. Each of the plurality of bypass wiring portions SLc2 has two ends SLe, and the extension wiring portion SLr is connected to each of the two ends SLe.

Here, in the frame region FRA where the bypass wiring portion GLc shown in FIG. 7 and the bypass wiring portion SLc2 shown in FIG. 8 are arranged, the arrangement of the intersection of the scan signal line GL and the image signal line SL is different from that of the display region DA. Therefore, it is difficult to use the frame region FRA as the effective display region. Therefore, in order to increase the occupancy of the effective display region in a plan view, it is preferable to reduce an area of the frame region FRA. Therefore, in the frame region FRA, the plurality of bypass wiring portions SLc2 are arranged at a narrower arrangement pitch than that of the plurality of image signal lines SL arranged in the display region DA. In this manner, the area of the frame region FRA can be reduced.

In the case of the color display apparatus, the image signal lines SL for use in a plurality of color types are necessary. As the plurality of image signal lines SL shown in FIG. 8, the case of the present embodiment includes a plurality of image signal lines SLR to which an image signal for use in a first color (such as a red color) is transmitted, a plurality of image signal lines SLB to which an image signal for use in a second color (such as a blue color) is transmitted, and a plurality of image signal lines SLG to which an image signal for use in a third color (such as a green color) is transmitted. In this case, three image signal lines SL are arranged for one pixel, and therefore, each arrangement pitch among the image signal lines SL is smaller than each arrangement pitch among the scan signal lines GL. Therefore, the number of the image signal lines SL arranged in the frame region FRA is larger than the number of the scan signal lines GL arranged in the frame region FRA. Therefore, on a factor for defining a lower allowable value of the area of the frame region FRA, the number of the image signal lines SL is more dominant than the number of the scan signal lines GL.

In order to reduce the area of the frame region FRA, it is important to reduce the arrangement pitch between the image signal lines SL arranged in the frame region FRA shown in FIG. 8. In the case of the display apparatus DSP1, the arrangement pitch between the bypass wiring portions SLc2 of the image signal lines SL arranged in the frame region FRA is smaller than the arrangement pitch between the extension wiring portions SLr of the image signal lines SL arranged in the display region DA. For example, in the example shown in FIG. 8, the arrangement pitch SLp1 between the image signal lines SL in the display region DA is 18 μm. On the other hand, the arrangement pitch SLp2 between the bypass wiring portions SLc2 in the frame region FRA is 4.5 μm. In the case of the display apparatus DSP1, since the arrangement pitch SLp2 between the bypass wiring portions SLc2 is smaller than the arrangement pitch SLp1 between the image signal lines SL in the display region DA, the area of the frame region FRA can be reduced.

However, according to the studies of the inventors of the present application, it has been found that the capacitive coupling (hereinafter, referred to as capacitive coupling or simply referred to as coupling) occurs between the adjacent bypass wiring portions SLc2 in some cases since the arrangement pitch between the bypass wiring portions SLc2 of the image signal lines SL is small in the frame region FRA. More specifically, as shown by a dashed dotted line in FIG. 6, "potential shift" occurs in the potential of the image signal supplied to each of the columns Bn−1, Rn, Gn and Bn. For example, a waveform of the signal supplied to the column Rn will be described as an example. As described above, the drawing shows a state in which the image signal having the positive polarity and the image signal having the negative polarity transit so as to draw the same phase as each other on the signal line S1 and the signal line S2 shown in FIG. 6, respectively. In the embodiment in FIG. 6, regarding the column inversion driving, since white writing is performed on the positive polarity supplied to the signal line S1, the potential transits from a predetermined reference potential to a high potential. And, since black writing is performed on the negative polarity supplied to the signal line S2, the potential transits from a low potential to a predetermined reference potential. Therefore, the potentials on the signal line S1 having the positive polarity and the signal line S2 having the negative polarity transit at the same timing in the same direction as each other. In this case, when the ON signal is supplied to the switch ASW1 first, a potential of the waveform of the signal supplied to the column Rn increases. Next, when the ON signal is supplied to the switch ASW2, a potential of the waveform of the signal supplied to the column Gn increases. In this case, when the bypass wiring portion SLc2 (see FIG. 8) connected to the column Rn and the bypass wiring portion SLc2 connected to the column Gn are adjacent to each other, the potential of the waveform of the signal supplied to the column Rn is further increased by influence of the capacitive coupling between the wirings. As described above, the increase of the potential of the waveform of the signal supplied to the column Rn caused when the ON signal is supplied to the switch ASW2 is the "potential shift". This potential shift is also caused when the ON signal is supplied to the switch ASW3. When the ON signal is supplied to the switch ASW3, the potential shift is caused by increase of a potential of the bypass wiring portion SLc2 connected to the column Bn−1.

The potential shift shown by a dashed dotted line in FIG. 6 is caused only on the image signal line SL including the bypass wiring portion SLc2 among many image signal lines SL shown in FIG. 8. On the sub pixel PXs (see FIG. 5) to which the signal waveform having the potential shift is supplied, the electric field to be formed is influenced by the potential shift. Depending on the display pattern, this influence of the potential shift is visually observed as display unevenness in some cases. The inventors of the present application have studied a method of suppressing the capacitive coupling on the adjacent bypass wiring portions SLc2 by making difference between the arrangement order of the plurality of bypass wiring portions SLc2 and the arrangement order of the plurality of image signal lines SL in the display region DA in the frame region FRA shown in FIG. 8.

<Wiring Layout in Frame Region>

Figure 9:
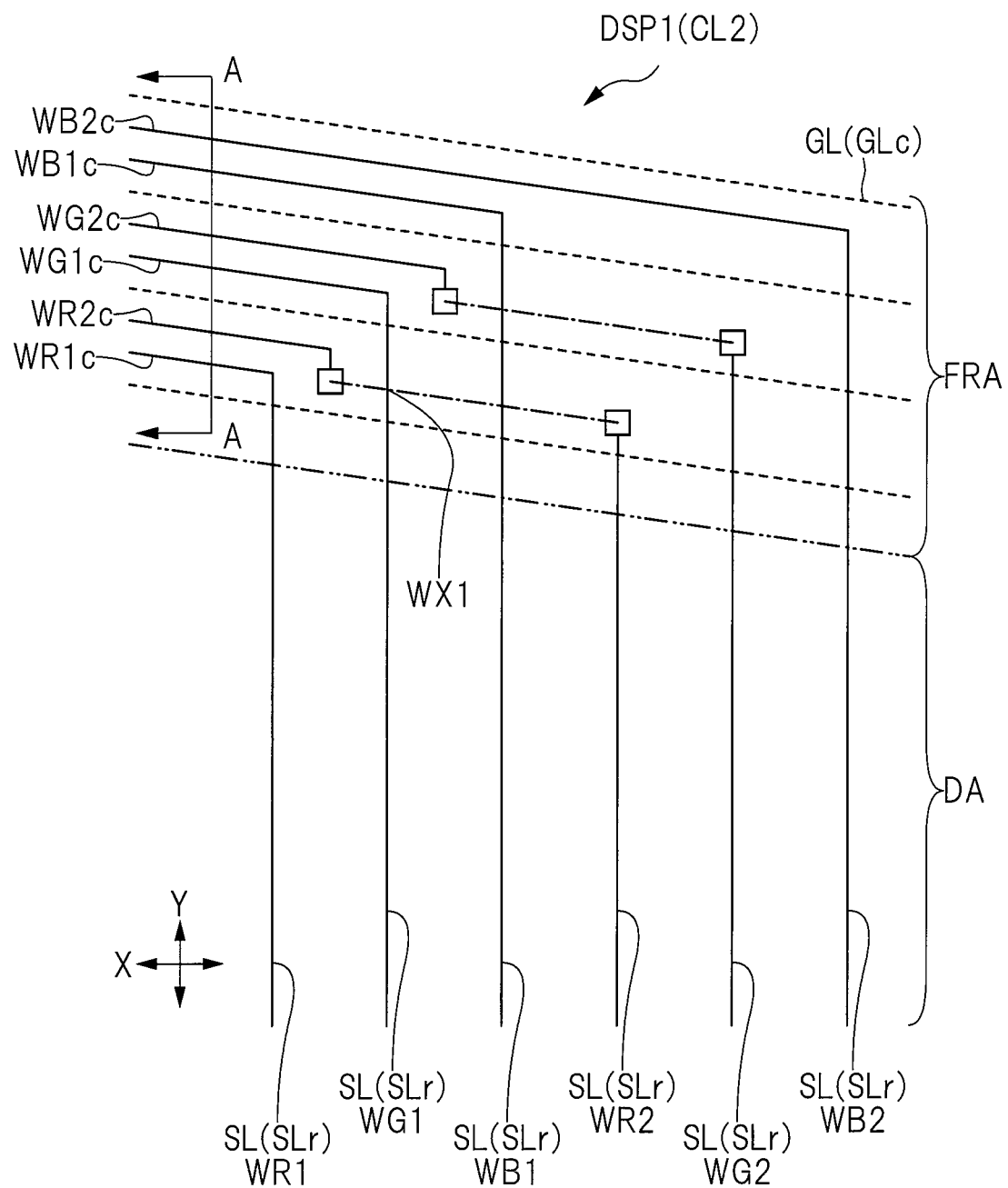
FIG. 9 is an enlarged plan view enlarging and showing a part of the second conductive layer shown in FIG. 8.
Figure 10:
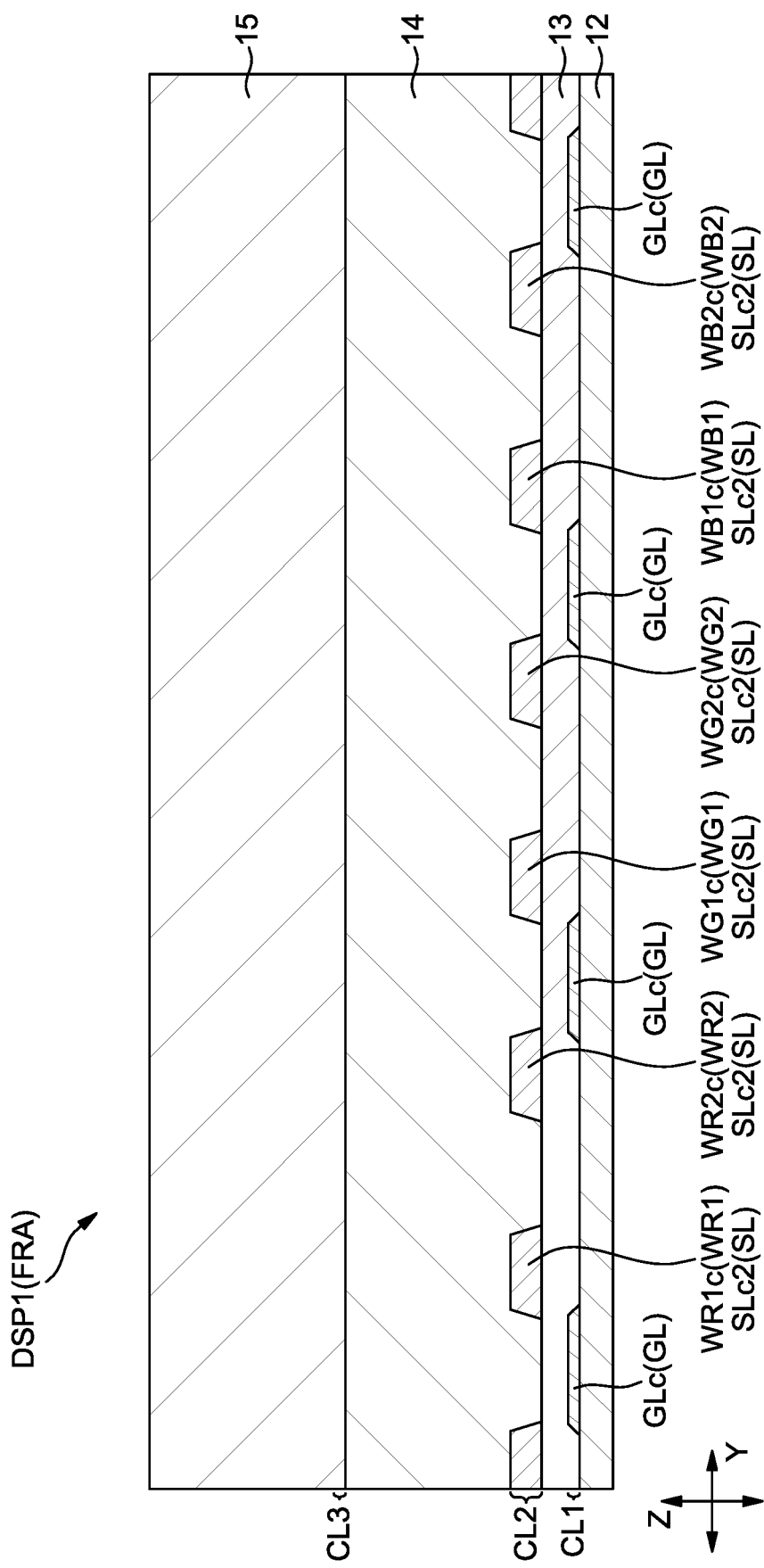
FIG. 10 is an enlarged cross-sectional view along a line A-A of FIG. 9.

Next, a layout of the image signal lines in the frame region will be described. FIG. 9 is an enlarged plan view enlarging and showing a part of the second conductive layer shown in FIG. 8. FIG. 10 is an enlarged cross-sectional view along a line A-A of FIG. 9. In FIG. 9, the scan signal line GL formed in the first conductive layer is shown by a dotted line, and a wiring formed in the third conductive layer is shown by a dashed dotted line. And, in FIG. 9, the boundary between the display region DA and the frame region FRA is shown by a dashed double-dotted line. In FIGS. 9 and 10, the image signal line SL that supplies the image signal to the sub pixel PXs on the column Rn shown in FIG. 5 is shown as a wiring (image signal line) WR1. Similarly, the image signal lines SL that supply the image signals to the sub pixels PXs on the columns G1, B1, R2, G2 and B2 shown in FIG. 5 are shown as wirings (image signal lines) WG1, WB1, WR2, WG2 and WB2, respectively. In FIGS. 9 and 10, the bypass wiring portion of the wiring WR1 is shown as a bypass wiring portion WR1c. Similarly, the bypass wiring portions of the wirings (image signal lines) WG1, WB1, WR2, WG2 and WB2 are shown as bypass wiring portions WG1c, WB1c, WR2c, WG2c, and WB2c, respectively.

In the following description, in a case of description of modification examples of FIGS. 9 and 10, the image signal lines SL are denoted with the same symbols as those of FIGS. 9 and 10. For example, a wiring WR3 shown in FIG. 13 that will be described later represents the image signal line SL that supplies the image signal to the sub pixel PXs on the column R3 shown in FIG. 5. A bypass wiring portion WR3c represents a wiring portion included in the wiring WR3 and extending in a different direction from that of the extension wiring portion SLr in the frame region FRA.

In the present embodiment, as shown in FIG. 9, the image signal lines SL running through the frame region FRA among the plurality of image signal lines SL are arranged in an arrangement order that is different between the display region DA and the frame region FRA. In other words, some of the plurality of image signal lines SL intersect with each other in the frame region FRA.

For example, in an example shown in FIG. 9, the plurality of image signal lines SL include the wiring WG1 and the wiring WR2. The wiring WG1 has the bypass wring portion WG1c arranged in the frame region FRA and two extension wiring portions SLr connected to both ends of the bypass wring portion WG1c and extending in the Y direction. The wiring WR2 has the bypass wring portion WR2c arranged in the frame region FRA and two extension wiring portions SLr connected to both ends of the bypass wring portion WR2c and extending in the Y direction. The wiring WG1 and the wiring WR2 intersect with each other in the frame region FRA. More specifically, the wiring WG1 and the wiring WR2 intersect with each other at an intersection WX1 shown in FIGS. 8 and 9. In the example shown in FIG. 9, the wiring WR2 intersects with each of the wiring WG1 and the wiring WB1. In this manner, when the plurality of image signal lines SL running through the frame region FRA intersect with one another, the capacitive coupling caused on the plurality of bypass wiring portions SLc2 arranged at a narrow pitch therebetween in the frame region FRA can be reduced.

As shown in FIG. 6, the potential shift due to the capacitive coupling between the adjacent wirings is caused when the ON signal or the OFF signal is applied to the adjacent wirings at a different timing from each other. Therefore, when the ON signal or the OFF signal is applied to the adjacent wirings at the same timing as each other, it is difficult to cause the potential shift.

As shown in FIG. 9, when the scan signal line GL is arranged between the adjacent image signal lines SL in a plan view, the scan signal line GL functions as a shield that suppresses the capacitive coupling on the image signal lines SL on both sides of the scan signal line. For example, in the case of the example shown in FIGS. 9 and 10, in a plan view (more specifically, a transparent plan view obtained by viewing the conductive layer CL2 so as to be transparent), the scan signal line GL is arranged between the bypass wiring portion WR2c and the bypass wiring portion WG1c and extends in extending directions of the bypass wiring portions WR2c and WG1c. In this case, the capacitive coupling between the bypass wiring portion WR2c and the bypass wiring portion WG1c can be reduced. For example, in the example shown in FIGS. 9 and 10, a parasitic capacitance of about 0.2 pF (picofarad) is caused between the wiring WR1 and the bypass wiring portion WR2c. On the other hand, a parasitic capacitance of about 0.07 pF is caused between the bypass wiring portion WR2c and the bypass wiring portion WG1c.

As shown in FIGS. 9 and 10, in the frame region FRA in the case of the present embodiment, the bypass wiring portion WR1c and the bypass wiring portion WR2c to each of which the ON signal or the OFF signal is applied at the same timing as each other are arranged so as to be adjacent to each other. Similarly, the bypass wiring portions WG1c and WG2c as well as the bypass wiring portions WB1c and WB2c are arranged so as to be adjacent to each other. In this case, occurrence of the coupling between the bypass wiring portions WR1c and WR2c, between the bypass wiring portions WG1c and WG2c and between the bypass wiring portions WB1c and WB2c can be suppressed.

In a plan view, the bypass wiring portion GLc of the scan signal line GL is arranged between the bypass wiring portions WR2c and WG1c and between the bypass wiring portions WG2c and WB1c. The bypass wiring portion GLc extends in the extending direction of the bypass wiring portion of the conductive layer CL2. In this case, the parasitic capacitances between the bypass wiring portions WR2c and WG1c and between the bypass wiring portions WG2c and WB1c are reduced by the arrangement of the scan signal line GL.

That is, in the case of the present embodiment, when the display region DA and the frame region FRA are different from each other in the arrangement order of the image signal lines SL running through the frame region FRA, the capacitive coupling can be reduced. As a result, the potential shift caused by the capacitive coupling in the frame region FRA can be reduced. As described above, although the potential shift becomes a cause of the display unevenness, the occurrence of the display unevenness can be suppressed by the present embodiment.

As shown in FIG. 1, the display apparatus DSP1 has the display regions DA on both sides of the frame region FRA in the Y direction. Therefore, the image signal lines SL intersect with each other at a plurality of positions in the frame region FRA. For example, the wiring WG1 and the wiring WR2 shown in FIG. 8 intersect with each other at an intersection WX1 and an intersection WX2. In this manner, in the Y direction shown in FIG. 1, the display qualities of the display regions DA arranged on both sides of the frame region FRA can be equalized to each other.

Figure 11:
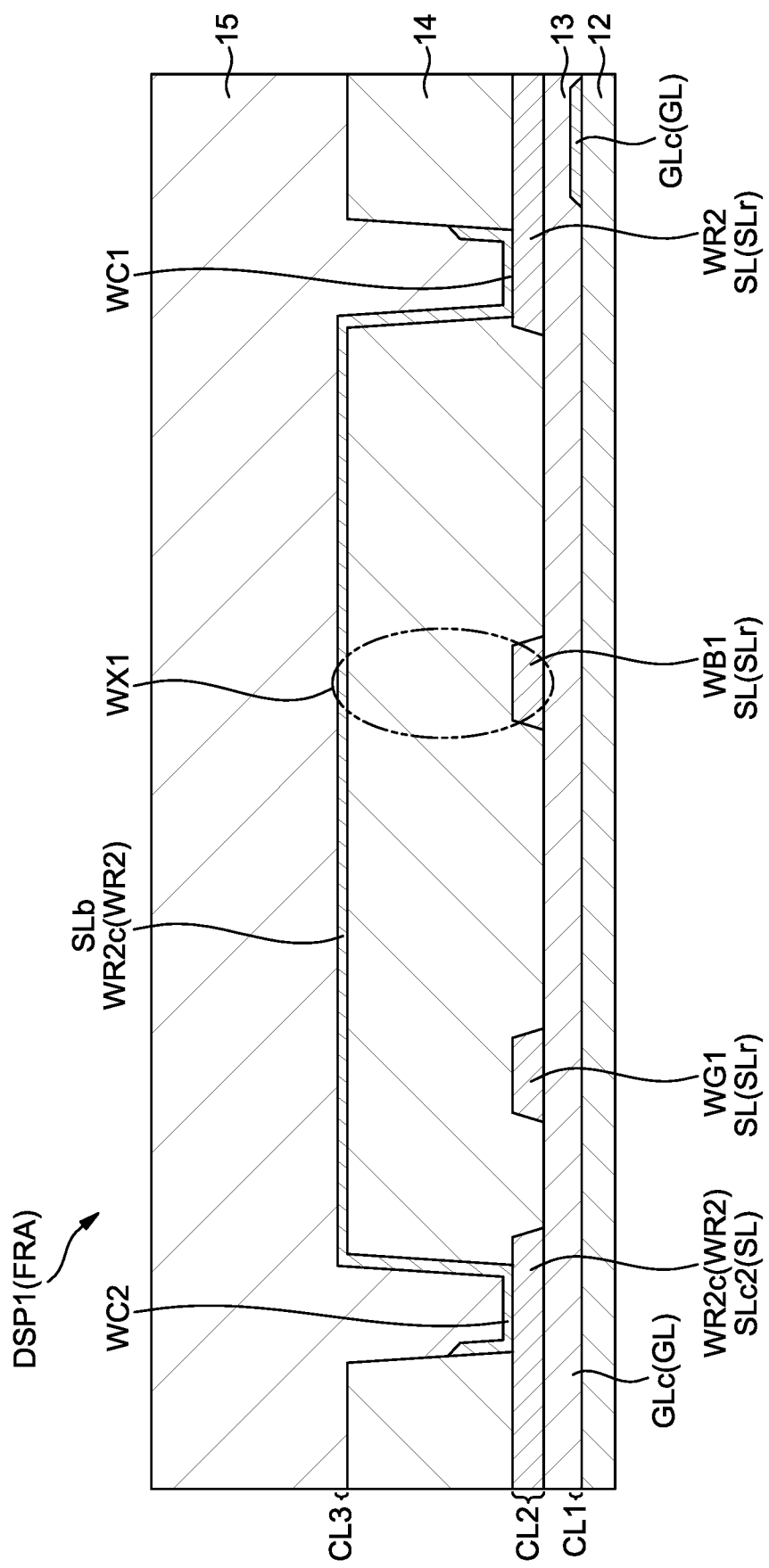
FIG. 11 is an enlarged cross-sectional view in an extending direction of an image signal line including a wiring formed in a third conductive layer among a plurality of image signal lines shown in FIG. 9.

FIG. 11 is an enlarged cross-sectional view in the extending direction of the image signal line including the wiring formed in the third conductive layer among the plurality of image signal lines shown in FIG. 9. More specifically, a cross-sectional view along a wiring route of the bypass wiring portion WR2c shown in FIG. 9 is shown in FIG. 11. As shown in FIG. 11, a bypass wiring SLb that is a part of the bypass wiring portion WR2c is formed in the conductive layer CL3 that is different from the conductive layers CL1 and CL2. One end of the bypass wiring SLb is connected to the extension wiring portion SLr of the wiring WR2 in the conductive layer CL2 while the other end of the same is connected to the bypass wiring portion WR2c in the conductive layer CL2. The bypass wiring SLb includes the intersection WX1 at which the wiring WR2 and the wiring WG1 intersect with each other.

When the plurality of image signal lines SL intersect with one another, it is necessary that at least one of the image signal lines SL should be formed in a conductive layer that is different from the conductive layer CL2. Here, as a modification example of FIG. 11, the bypass wiring SLb can be formed in the conductive layer CL1. However, in the conductive layer CL1, the plurality of scan signal lines GL are arranged. Therefore, it is necessary to avoid interference between the bypass wiring SLb including the contact portions WC1 and WC2 and the scan signal lines GL. As a result, there is a concern about increase in the area of the frame region FRA shown in FIG. 8. Meanwhile, when the bypass wiring SLb is formed in the conductive layer CL3 as shown in FIG. 11, the interference between the scan signal lines GL and the bypass wiring SLb does not occur. As a result, even when the plurality of image signal lines SL intersect with one another, the increase in the area of the frame region FRA can be suppressed.

With reference to FIGS. 5 and 9, the potentials having the different polarities from each other are supplied to the wiring WR1 and the wiring WR2 shown in FIG. 9. For example, in the display frame shown in FIG. 5, a positive potential is supplied to the wiring WR1 (see FIG. 9) connected to the column R1, and a negative potential is supplied to the wiring WR2 (see FIG. 9) connected to the column R2. In a next display frame following the display frame shown in FIG. 5, a negative potential is supplied to the wiring WR1, and a positive potential is supplied to the wiring WR2. Also to the wiring WG1 and the wiring WG2 and to the wiring WB1 and the wiring WB2 shown in FIG. 9, potentials having different polarities from each other are supplied, respectively.

When potentials having different polarities from each other are supplied to two wirings that are adjacent to each other and extend in the same direction as each other, magnetic fluxes that are caused by flow of a current in the two wirings are cancelled by each other, and therefore, influence of mutual inductance between the two wirings can be reduced. For example, in the case of the example shown in FIG. 9, the influence of the mutual inductance between the bypass wiring portion WR1c and the bypass wiring portion WR2c can be reduced. Similarly, the influence of the mutual inductance between the bypass wiring portion WG1c and the bypass wiring portion WG2c can be reduced. The influence of the mutual inductance between the bypass wiring portion WB1c and the bypass wiring portion WB2c can be reduced.

Figure 12:
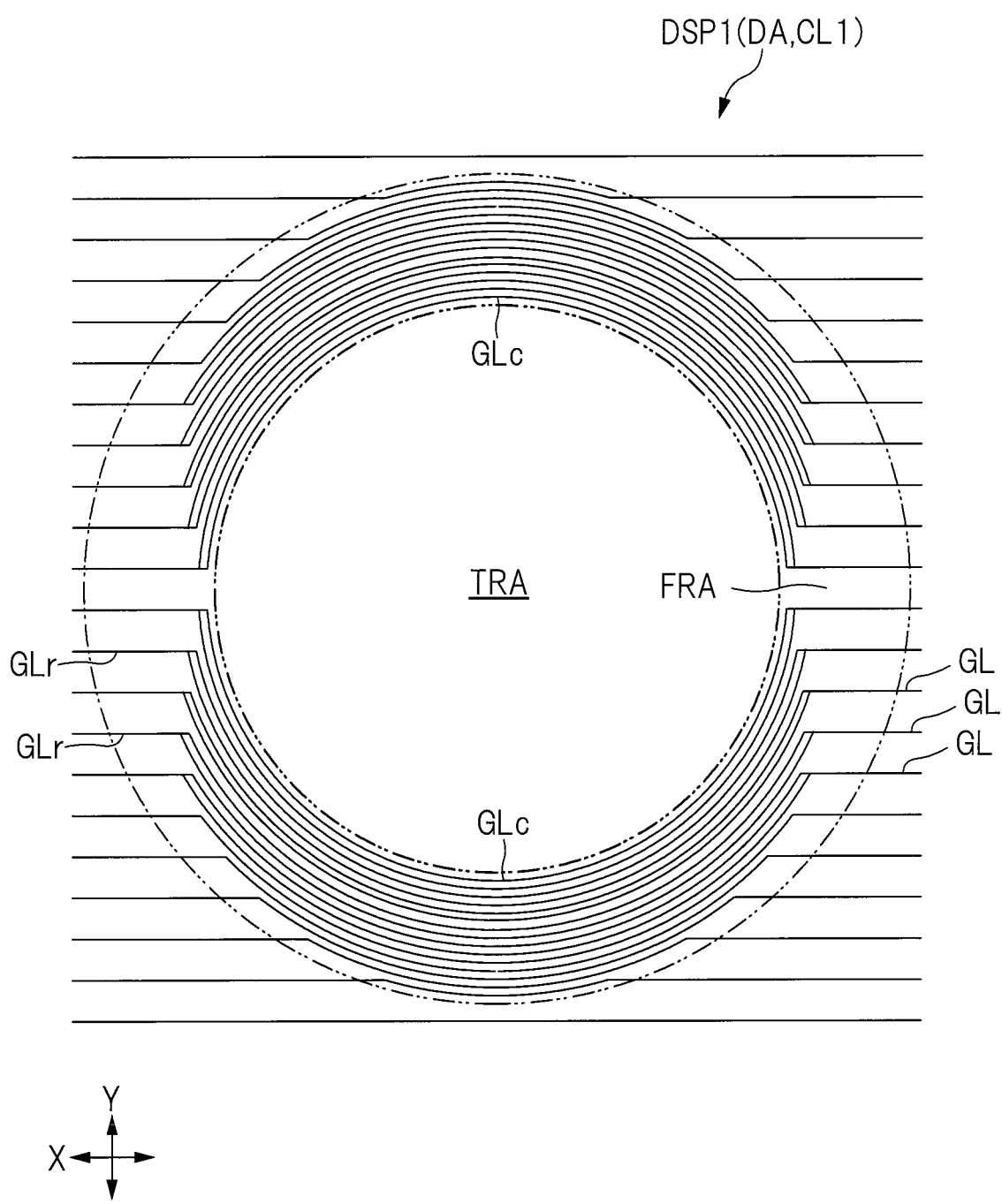
FIG. 12 is a plan view showing a configuration example of a plurality of scan signal lines shown in FIG. 7.

Incidentally, when the number of the types of the image signal lines SL is three for the red, the green and the blue colors as described in the present embodiment, the number of the image signal lines SL is three times the number of the scan signal lines GL. Therefore, when two image signal lines SL are arranged between the adjacent scan signal lines GL in a plan view as shown in FIG. 9, there is the insufficient scan signal lines GL. As a method of compensating the insufficiency of the scan signal lines GL, for example, in the example shown in FIG. 12, some of the plurality of scan signal lines GL branch into a plurality of (in FIG. 12, two) wirings in the frame region FRA. FIG. 12 is a plan view showing a configuration example of the plurality of scan signal lines shown in FIG. 7. A structure shown in FIG. 12 can be described as follows. The plurality of scan signal lines include a scan signal line having a plurality of bypass wiring portions connected to one extension wiring portion GLr. In other words, each of some of the scan signal lines has a first bypass wiring connected to a first extension wiring portion GLr and a second bypass wiring connected to the first extension wiring portion GLr and extending so as to separate from the first bypass wiring portion.

Although illustration is omitted, a wiring to which a ground potential is supplied is arranged between the plurality of bypass wiring portions GLc in some cases as another modification example of the compensation for the insufficiency of the scan signal lines GL.

Figure 13:
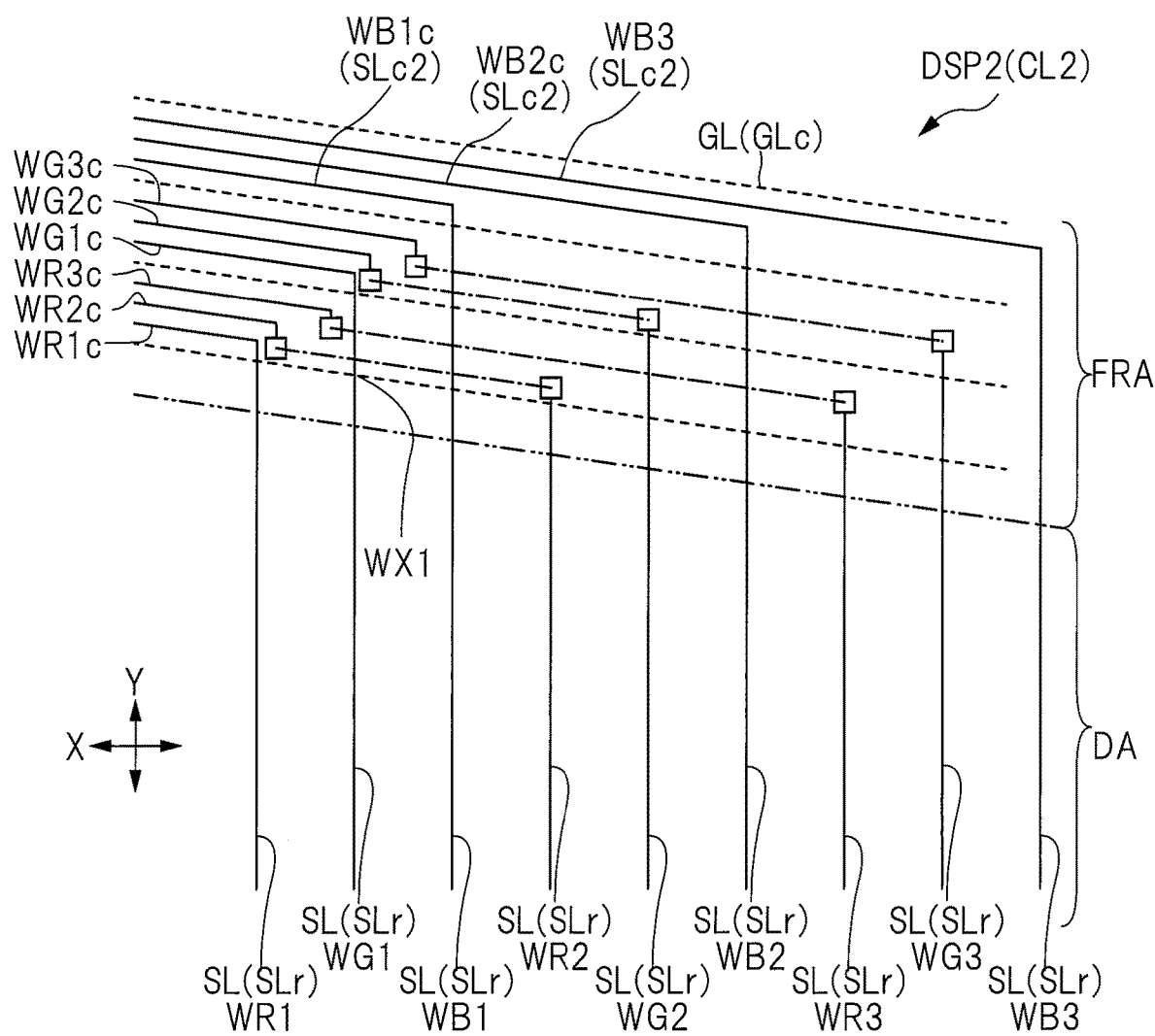
FIG. 13 is an enlarged plan view enlarging and showing a part of a second conductive layer of a display apparatus that is a modification example of FIG. 9.

FIG. 13 is an enlarged plan view enlarging and showing a part of the second conductive layer of the display apparatus that is a modification example of FIG. 9. In FIG. 13, the scan signal line GL formed in the first conductive layer is shown by a dotted line, and the wiring formed in the third conductive layer is shown by a dashed dotted line. In FIG. 13, a boundary between the display region DA and the frame region FRA is shown by a dashed double-dotted line.

In a case of a modification example shown in FIG. 13, there is not the insufficient scan signal lines GL relative to the number of the image signal lines SL. The display apparatus DSP2 shown in FIG. 13 is different from the display apparatus DSP1 shown in FIG. 9 in that the bypass wiring portions SLc2 of three image signal lines SL are arranged between the bypass wiring portions GLc of the adjacent scan signal lines GL in the frame region FRA. In the example shown in FIG. 13, between the bypass wiring portions GLc of the adjacent scan signal lines GL, a set of bypass wiring portions WR1c, WR2c and WR3c, a set of bypass wiring portions WG1c, WG2c and WG3c or a set of bypass wiring portions WB1c, WB2c and WB3c is arranged. To each of the set of bypass wiring portions WR1c, WR2c and WR3c, the set of bypass wiring portions WG1c, WG2c and WG3c and the set of bypass wiring portions WB1c, WB2c and WB3c, the writing signal is transmitted at the same timing as one another.

The bypass wiring portions WR3c and WG1c are adjacent to each other in the conductive layer CL2. The writing signal is transmitted to each of the bypass wiring portions WR3c and the WG1c at different timings from each other, and therefore, it is necessary to suppress the potential shift caused by the capacitive coupling. However, in a plan view (more specifically, a transparent plan view obtained by viewing the conductive layer CL2 so as to be transparent), the bypass wiring portion GLc of the scan signal line GL is arranged between the bypass wiring portions WR3c and WG1c so as to extend in the extending directions of the bypass wiring portions WR3c and WG1c. Therefore, the parasitic capacitance caused between the bypass wiring portions WR3c and WG1c is small. Thus, between the wiring WR3 and WG1, the influence of the potential shift caused by the capacitive coupling is small.

In the frame region FRA of the case of the display apparatus DSP2, three image signal lines SL are arranged with respect to one scan signal line GL. Therefore, there is not the insufficient number of the scan signal lines GL relative to the number of the image signal lines SL. Therefore, as shown in FIG. 12, this manner is preferable because it is unnecessary to take the measures such as the branching of some of the plurality of scan signal lines GL.

Figure 14:
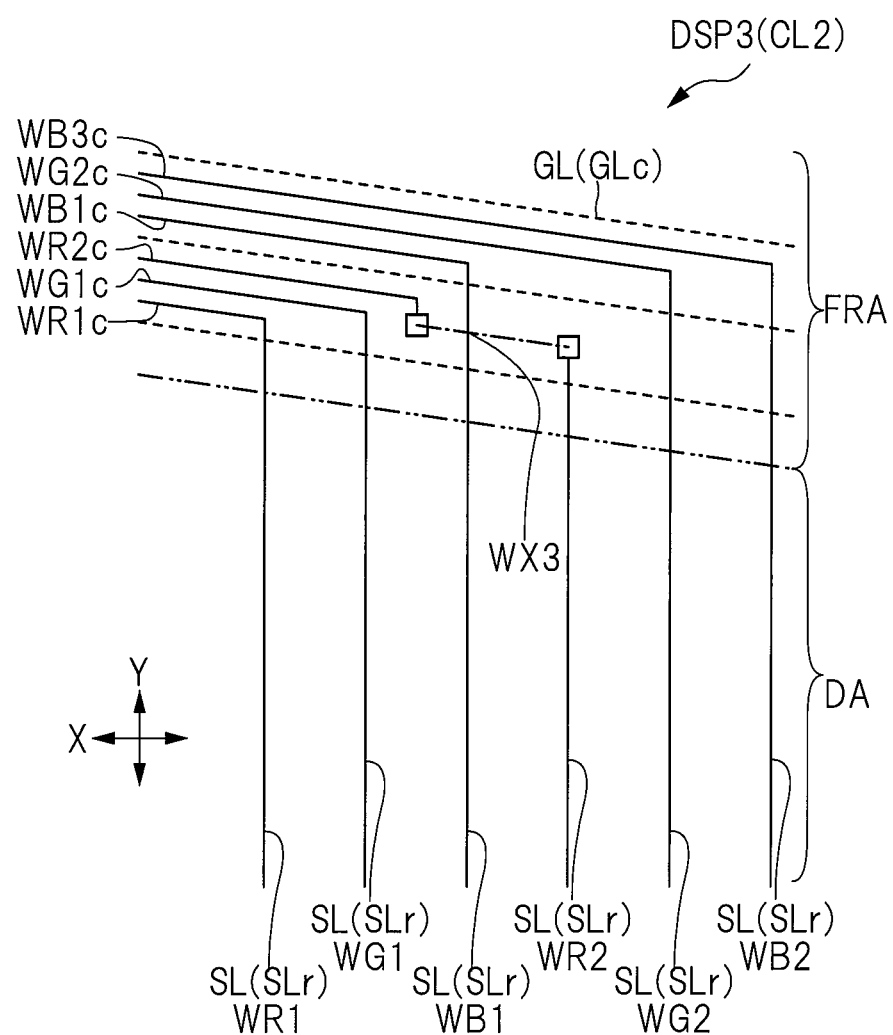
FIG. 14 is an enlarged plan view enlarging and showing a part of a second conductive layer of a display apparatus that is another modification example of FIG. 9.

FIG. 14 is an enlarged plan view enlarging and showing a part of the second conductive layer of the display apparatus that is another modification example of FIG. 9. In FIG. 14, the scan signal line GL formed in the first conductive layer is shown by a dotted line, and the wiring formed in the third conductive layer is shown by a dashed dotted line. In FIG. 14, a boundary between the display region DA and the frame region FRA is shown by a dashed double-dotted line.

In a case of the display apparatus DSP1 shown in FIG. 14, regarding a set of six image signal lines SL, an intersection at which the image signal lines SL intersect with one another is only an intersection WX3 at which the wiring WR2 and the wiring WB1 intersect with each other. In this manner, when the number of the intersections can be reduced, the number of the contacts WC1 and WC2 (see FIG. 11) connected to the intersections can be reduced. This manner is effective when, for example, the arrangement pitch among the bypass wiring portions SLc2 arranged in the frame region FRA becomes further smaller so as to make difficult to form the space where the contacts WC1 and WC2 are arranged.

In a case of the display apparatus DSP3, the bypass wiring portion WG1c is arranged between the bypass wiring portions WR1c and WR2c in the frame region FRA. The bypass wiring portion WG2c is arranged between the bypass wiring portions WB1c and WB2c. As described above, to the bypass wirings WR1 and WR2, the different potentials from each other are supplied. Therefore, when the writing signal is transmitted to the bypass wiring portions WR1c and WR2c, the magnetic fluxes caused by the current flow of the writing signal are cancelled by each other. Therefore, noise influence on the wiring WG1 due to the transmission of the writing signal to the wirings WR1 and WR2 can be reduced.

Second Embodiment

Figure 15:
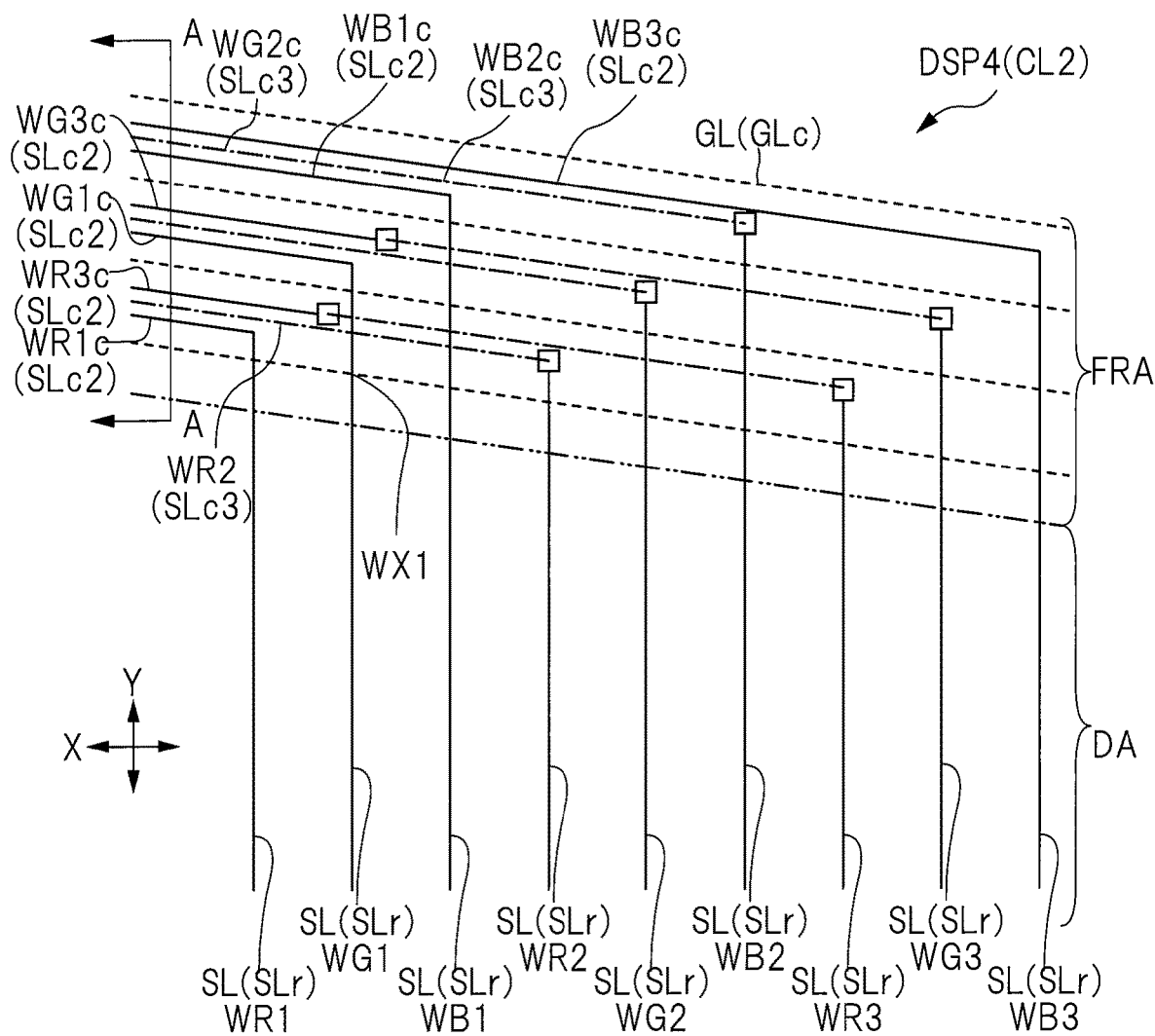
FIG. 15 is an enlarged plan view enlarging and showing a part of a second conductive layer of a display apparatus that is still another modification example of FIG. 9.
Figure 16:
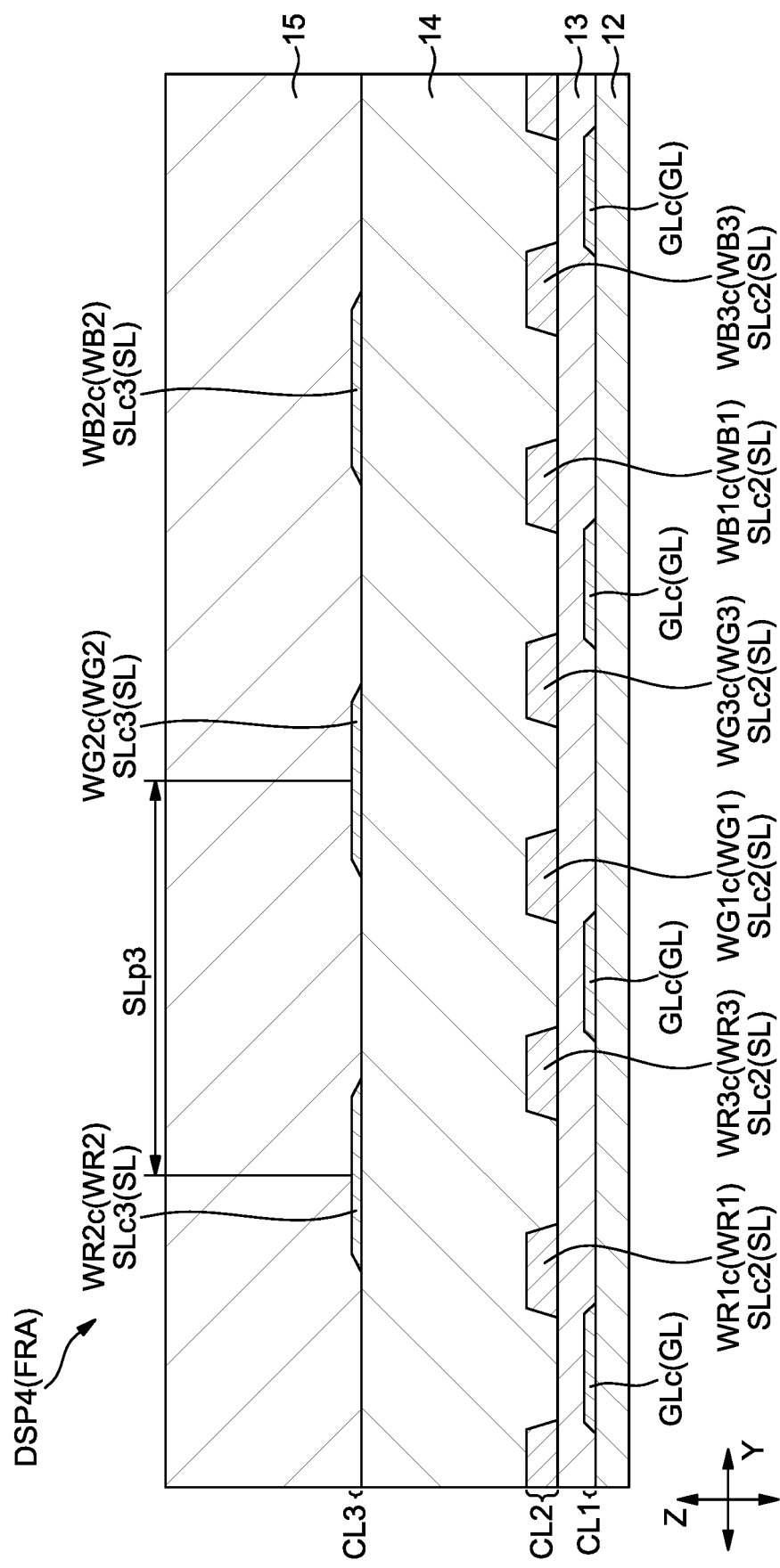
FIG. 16 is an enlarged cross-sectional view along a line A-A of FIG. 15.

In the above-described first embodiment, the aspect of the formation of almost all the bypass wiring portions of the image signal lines SL in the conductive layer CL2 has been described. As a method of further reducing the area of the frame region FRA in comparison with the above-described first embodiment, the inventors of the present application have studied a structure utilizing the conductive layer CL3 shown in FIGS. 10 and 11 as the arrangement space for the bypass wiring portions. In the present second embodiment, an aspect of a case of routing the bypass wiring portions of the image signal lines SL in a plurality of conductive layers will be described. FIG. 15 is an enlarged plan view enlarging and showing a part of the second conductive layer of the display apparatus that is still another modification example of FIG. 9. FIG. 16 is an enlarged cross-sectional view along a line A-A of FIG. 15. In FIG. 15, the scan signal line GL formed in the first conductive layer is shown by a dotted line, and the wiring (including the bypass wiring SLb) formed in the third conductive layer is shown by a dashed dotted line. In FIG. 15, a boundary between the display region DA and the frame region FRA is shown by a dashed double-dotted line.

A display apparatus DSP4 shown in FIGS. 15 and 16 is different from the display apparatus DSP1 shown in FIGS. 9 and 10 in that the conductive layer CL2 and the conductive layer CL3 (see FIG. 16) are used to route the bypass wiring portions of the image signal lines SL. In other words, the plurality of bypass wiring portions of the image signal lines SL included in the display apparatus DSP2 include a plurality of bypass wiring portions (second-layer bypass wiring portions) SLc2 arranged in the conductive layer CL2 shown in FIG. 16 and a plurality of bypass wiring portions (third-layer bypass wiring portions) SLc3 arranged in the conductive layer CL3. An arrangement pitch SLp3 between the bypass wiring portions SLc3 shown in FIG. 16 is smaller than an arrangement pitch SLp1 between the image signal lines SL in the display region DA of the conductive layer CL2 shown in FIG. 8. For example, the arrangement pitch SLp3 between the bypass wiring portions SLc3 is 9 μm.

In the case of the display apparatus DSP4, since the conductive layer CL3 is utilized as the arrangement space for the bypass wiring portions SLc3, the area of the frame region FRA can be made smaller than that of the display apparatus DSP1 shown in FIG. 8.

In the case of the display apparatus DSP4, each of the bypass wiring portions WR2c, WG2c and WB2c is formed in the conductive layer CL3 (see FIG. 16). Each of the bypass wiring portions WR1c, WR3c, WG1c, WG3c, WB1c and WB3c is formed in the conductive layer CL2. The bypass wiring portion WR2c extends along the bypass wiring portion WR1c and the bypass wiring portion WR3c. The bypass wiring portion WG2c extends along the bypass wiring portion WG1c and the bypass wiring portion WG3c. The bypass wiring portion WB2c extends along the bypass wiring portion WB1c and the bypass wiring portion WB3c.

In the case of the display apparatus DSP4 as shown in FIG. 15, between the adjacent bypass wiring portions GLc, a set of bypass wiring portions WR1c, WR2c and WR3c, a set of bypass wiring portions WG1c, WG2c and WG3c or a set of bypass wiring portions WB1c, WB2c and WB3c is arranged. To the set of bypass wiring portions WR1c, WR2c and WR3c, the set of bypass wiring portions WG1c, WG2c and WG3c and the set of bypass wiring portions WB1c, WB2c and WB3c, the writing signal is transmitted at the same timing as one another.

The bypass wiring portions WR3c and WG1c are adjacent to each other in the conductive layer CL2. The writing signal is transmitted to the bypass wiring portions WR3c and the WG1c at different timings from each other, and therefore, it is necessary to suppress the potential shift caused by the capacitive coupling. However, in a plan view (more specifically, a transparent plan view obtained by viewing the conductive layer CL2 so as to be transparent), the bypass wiring portion GLc of the scan signal line GL is arranged between the bypass wiring portions WR3c and WG1c so as to extend in the extending directions of the bypass wiring portions WR3c and WG1c. Therefore, the parasitic capacitance caused between the bypass wiring portions WR3c and WG1c is small. Thus, between the wiring WR3c and WG1, the influence of the potential shift caused by the capacitive coupling is small. This point is the same as that of the display apparatus DSP2 described with reference to FIG. 13.

Figure 17:
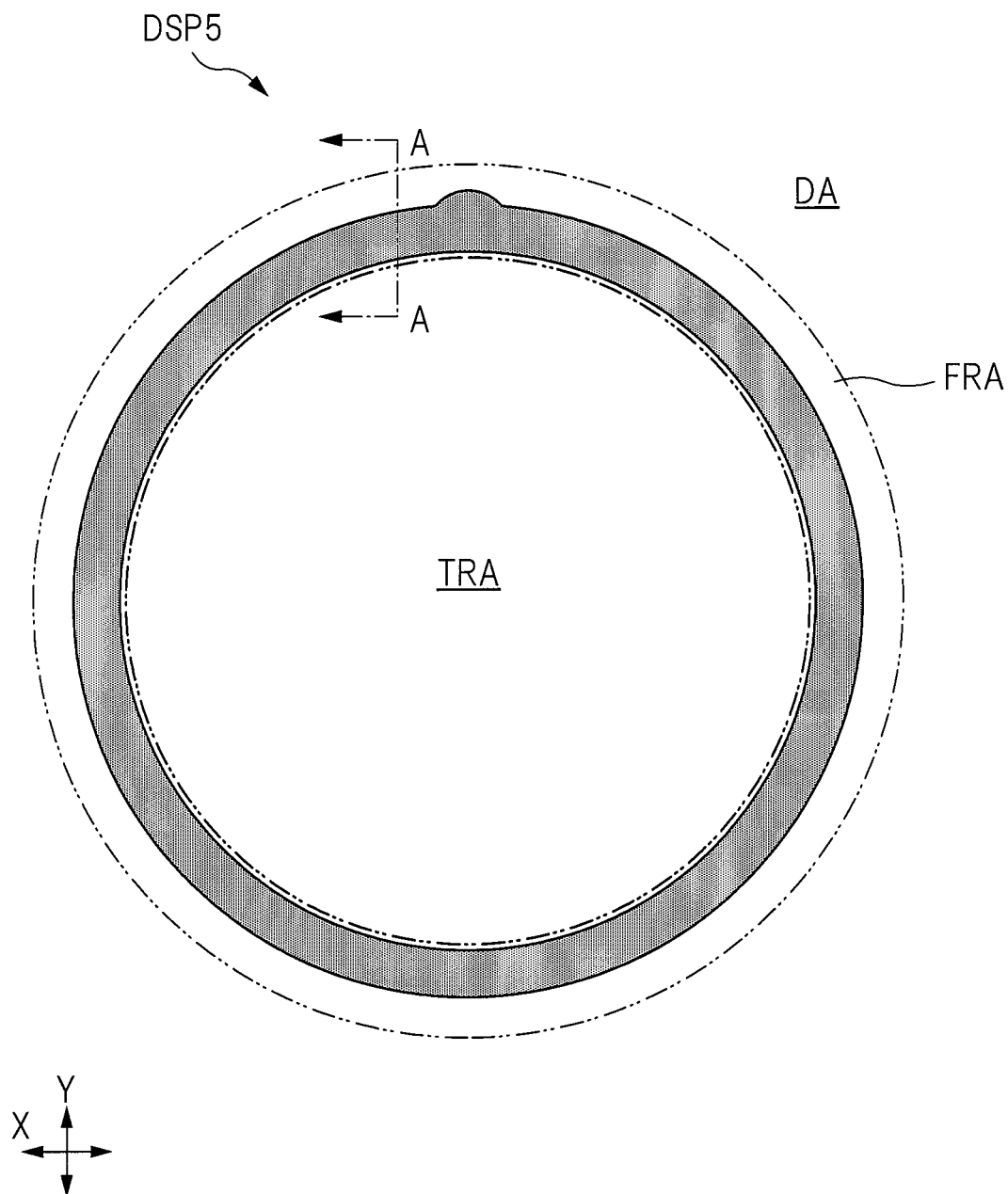
FIG. 17 is an enlarged plan view showing a plan shape of a sealing member arranged in a frame region around a transparent region included in a display apparatus that is a modification example of the display apparatus shown in FIG. 1.
Figure 18:
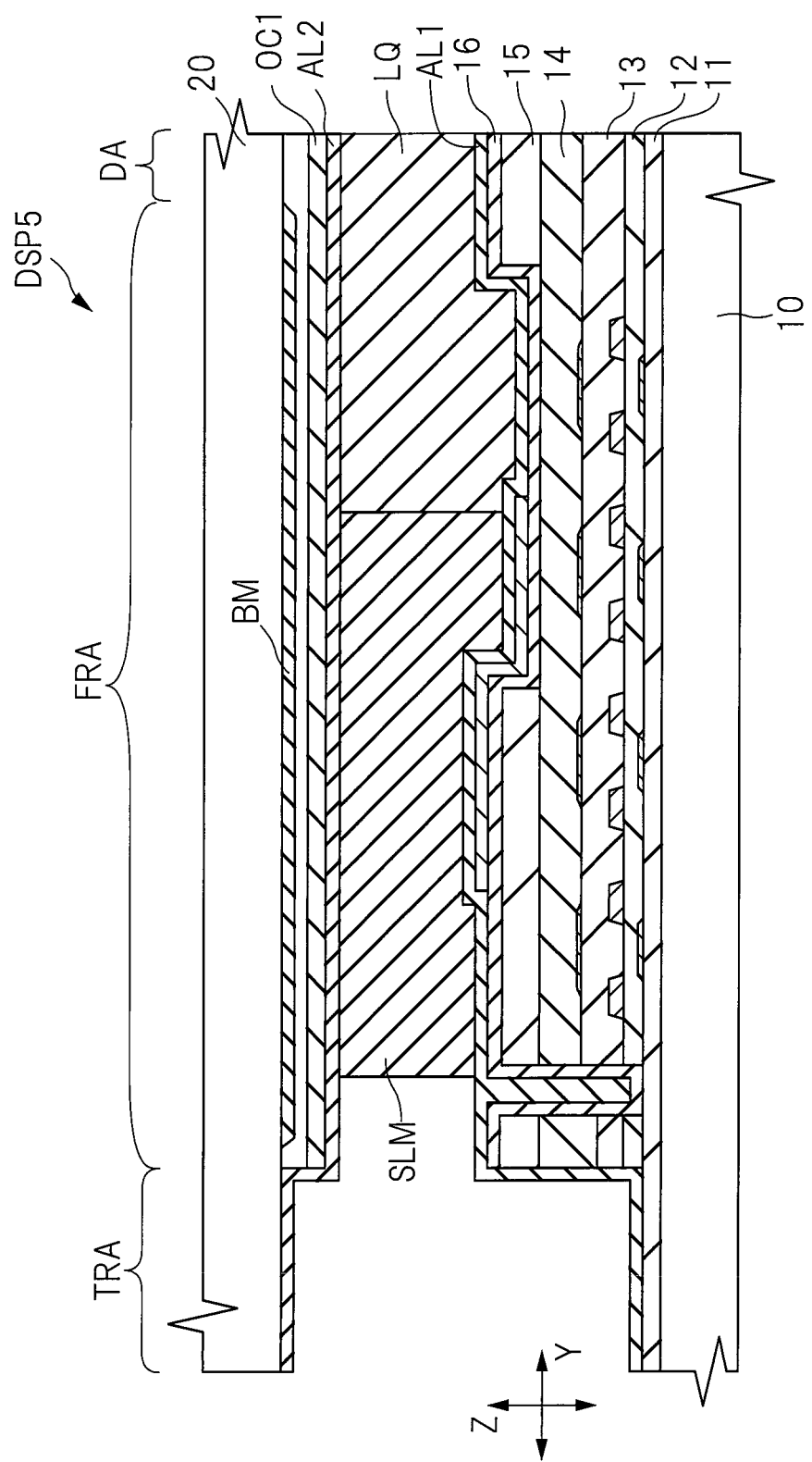
FIG. 18 is an enlarged cross-sectional view along a line A-A of FIG. 17.

In the case of the display apparatus DSP4, the area of the frame region FRA can be made smaller while the potential shift caused by the capacitive coupling can be suppressed more than those of the display apparatus DSP1 shown in FIG. 1. However, as seen in a display apparatus DSP5 shown in FIGS. 17 and 18, a sealing member SLM may be arranged so as to overlap the light-blocking metallic wiring in some cases. When the sealing member SLM is formed in the frame region FRA, it is necessary to provide a structure in consideration of penetration of light for curing the sealing member SLM, more specifically, ultraviolet ray. FIG. 17 is an enlarged plan view showing a plan shape of the sealing member arranged in the frame region around the transparent region TRA included in the display apparatus that is a modification example of the display apparatus shown in FIG. 1. FIG. 18 is an enlarged cross-sectional view along a line A-A of FIG. 17.

As shown in FIG. 17, the display apparatus DSP1 has the sealing member SLM that is arranged in the frame region FRA so as to surround the transparent region TRA and bonds the substrate 10 (see FIG. 18) and the substrate 20 (see FIG. 18). The sealing member SLM is made of the same material as that of the sealing member SLM arranged in the peripheral region PFA shown in FIGS. 1 and 2, and has a function of suppressing leakage of the liquid crystal layer LQ (see FIG. 18) to outside of the display region DA. In an example shown in FIG. 18, there are the substrate 10 and the substrate 20 in the transparent region TRA. Meanwhile, when the sealing member SLM is arranged over the entire periphery of the frame region FRA, an opening that penetrates the substrate 10 (or the substrate 10 and the substrate 20) can be formed in the transparent region TRA.

The sealing member SLM contains an ultraviolet curable resin. In a manufacturing step of a display apparatus DSP5, the sealing member SLM is applied as shown in FIG. 17, and then, the sealing member SLM is irradiated with the ultraviolet rays. In this manner, the sealing member SLM shown in FIG. 18 is cured, so that the substrate 10 and the substrate 20 are bonded to each other. By the curing of the sealing member SLM between the substrate 10 and the substrate 20, the liquid crystal can be prevented from penetrating from the display region DA to the transparent region TRA. In this case, the transparency of the transparent region TRA can be prevented from being interrupted by the liquid crystal. In order to cure the sealing member SLM made of the ultraviolet curable resin in the frame region FRA, it is necessary to allow the sealing member SLM to be irradiated by the ultraviolet rays. A light blocking film BM is arranged between the sealing member SLM and the substrate 20. The sealing member SLM is covered by the light blocking film BM. Therefore, in order to allow the sealing member SLM to be irradiated by the ultraviolet rays, it is necessary to allow it to be irradiated by the ultraviolet rays from a side close to the substrate 10.

In the case of the display apparatus DSP4 shown in FIG. 16, regions between the bypass wiring portions WR1c and WR3c, between the bypass wiring portions WG1c and WG3c and between the bypass wiring portions WB1c and WB3c do not overlap the bypass wiring portion GLc of the scan signal line GL. However, each of the regions between the bypass wiring portions WR1c and WR3c, between the bypass wiring portions WG1c and WG3c and between the bypass wiring portions WB1c and WB3c is covered by the bypass wiring portion SLc3. Therefore, in order to allow the sealing member SLM to be irradiated by the ultraviolet rays from the side close to the substrate 10 shown in FIG. 18, it is necessary to provide an optical path that transmits the ultraviolet rays in the regions between the bypass wiring portions WR1c and WR3c, between the bypass wiring portions WG1c and WG3c and between the bypass wiring portions WB1c and WB3c.

Figure 19:
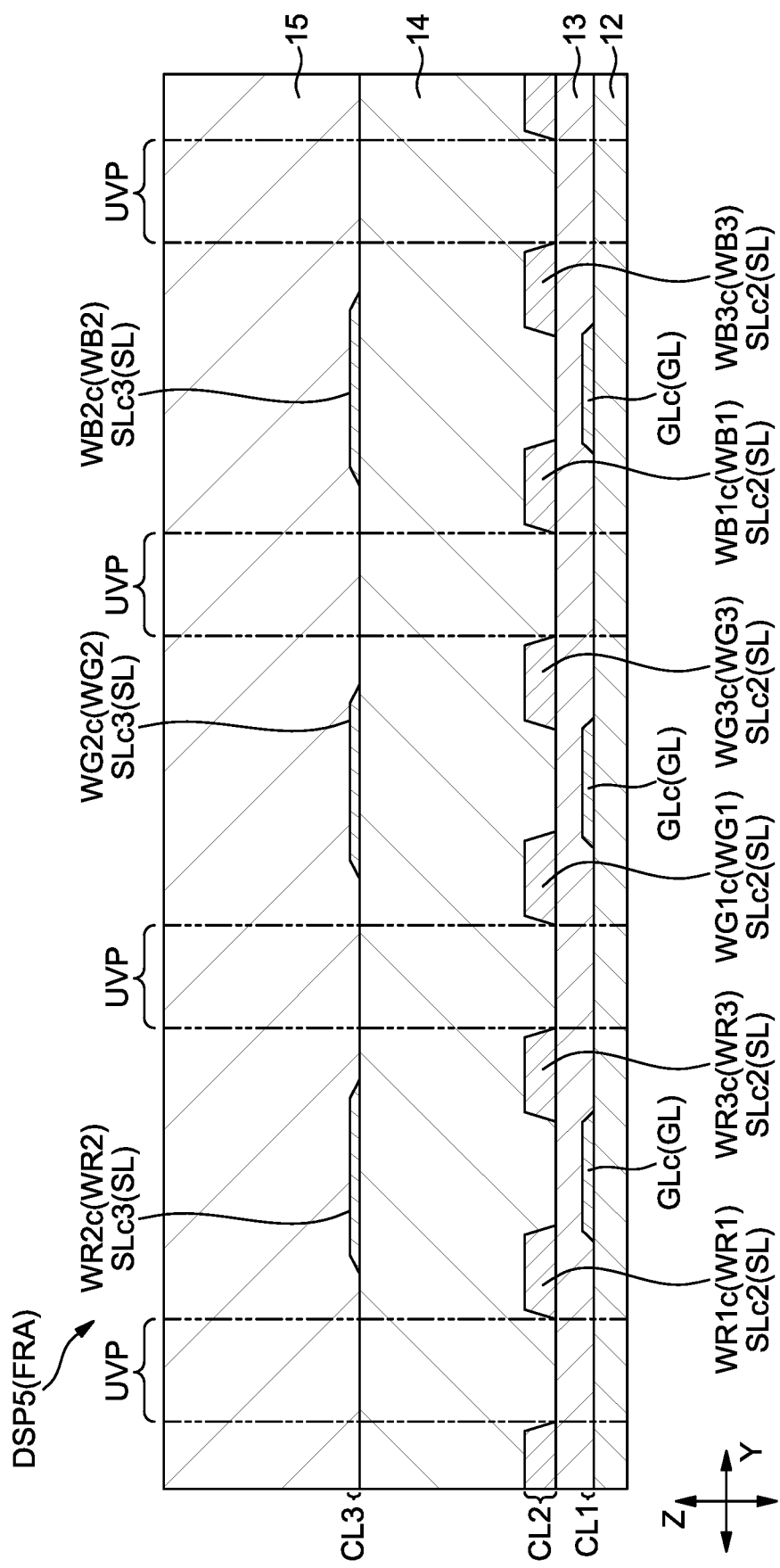
FIG. 19 is an enlarged cross-sectional view of a cross section of the display apparatus shown in FIGS. 17 and 18, the cross section corresponding to the line A-A shown in FIG. 15.
Figure 20:
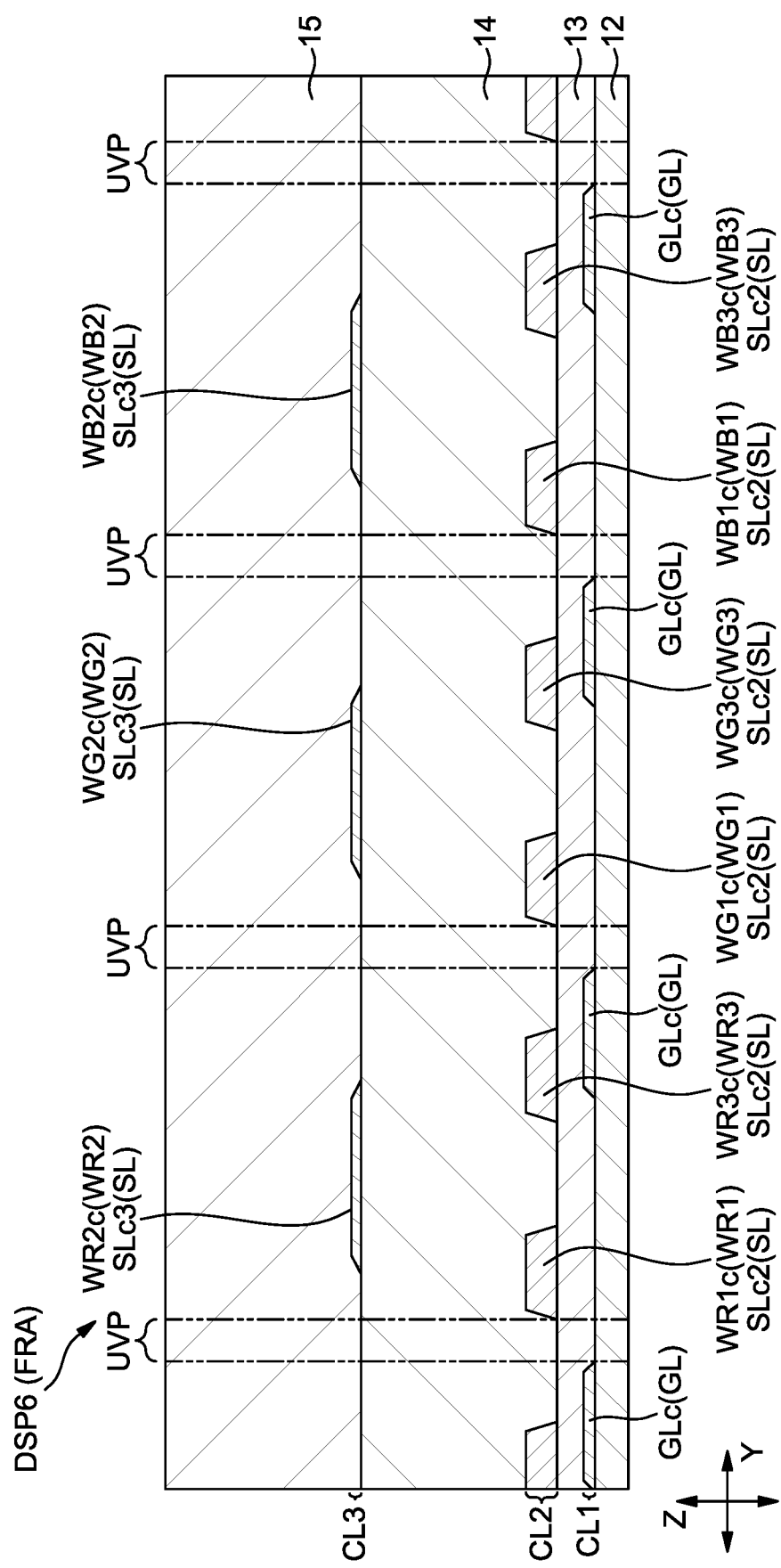
FIG. 20 is an enlarged cross-sectional view of a display apparatus that is a modification example of FIG. 19.

FIG. 19 is an enlarged cross-sectional view of a cross section of the display apparatus shown in FIGS. 17 and 18, the cross section corresponding to the line A-A shown in FIG. 15. FIG. 20 is an enlarged cross-sectional view of a display apparatus that is a modification example of FIG. 19.

In the display apparatus DSP5 shown in FIG. 19, the bypass wiring portion SLc3 of the image signal lien SL formed in the conductive layer CL3 and the bypass wiring portion GLc of the scan signal lien GL formed in the conductive layer CL1 overlap each other in the thickness direction (Z direction) of the substrate 10 (see FIG. 18). In an example shown in FIG. 19, each of the bypass wiring portions GLc of the scan signal liens GL is entirely covered by the bypass wiring portion SLc3 of the image signal lien SL. In this case, as shown in FIG. 19, an optical path UVP is formed between the bypass wiring portions WR3c and WG1c and between the bypass wiring portions WG3c and WB1c. The optical path UVP is a guiding path for the ultraviolet rays. That is, in a case of the structure shown in FIG. 19, the optical path UVP is arranged, and therefore, the sealing member SLM shown in FIG. 18 can be cured by the ultraviolet rays.

In the display apparatus DSP5 shown in FIG. 19, the bypass wiring portions WR3c and WG1c to which the writing signal is transmitted at the different timing from each other are adjacent to each other so as not to interpose the scan signal line GL therebetween. Therefore, between the bypass wiring portions WR3c and WG1c, a parasitic capacitance of about 0.17 pF (picofarad) is formed. In the example shown in FIG. 19, among parasitic capacitances between the plurality of wirings, the parasitic capacitances formed between the bypass wiring portions WR3c and WG1c and between the bypass wiring portions WG3c and WB1c are the largest.

When the writing signal is transmitted to the bypass wiring portion SLc3 formed in the conductive layer CL3 shown in FIG. 19 and the bypass wiring portion SLc2 arranged at the position overlapping this bypass wiring portion SLc3 at the different timing from each other, a large parasitic capacitance is formed between the bypass wiring portions SLc3 and SLc2. For example, if the positions of the bypass wiring portion WR2c and the bypass wiring portion WG2c that are formed in the conductive layer CL3 shown in FIG. 19 are exchanged to each other, a parasitic capacitance formed between the bypass wiring portions WG2c and WR1c is about 0.47 pF. This value is a value that is about three times the above-described value 0.17 pF. Accordingly, in the display apparatus DSP5 shown in FIG. 19, the formation of the parasitic capacitance of 0.17 pF that is relatively small is allowed, and the formation of the parasitic capacitance of 0.47 pF is suppressed.

The structure example shown in FIG. 19 can be interpreted as follows. That is, each of the bypass wiring portions WR1c and WR3c formed in the conductive layer CL2 overlaps each of the bypass wiring portion WR2c formed in the conductive layer CL3 and the bypass wiring portion GLc of the scan signal line GL formed in the conductive layer CL1. To each of the wirings WR1, WR2 and WR3, the writing signal is transmitted at the same timing as one another.

In a display apparatus DSP6 shown in FIG. 20, although the optical path UVP is narrower than that of the example shown in FIG. 19, the value of the parasitic capacitance can be made smaller. In the display apparatus DSP6, the bypass wiring portion SLc3 formed in the conductive layer CL3 and the bypass wiring portion GLc formed in the conductive layer CL1 partially overlap each other. The bypass wiring portion SLc3 has a portion that does not overlap the bypass wiring portion GLc. The bypass wiring portion GLc has a portion that does not overlap the bypass wiring portion SLc3. The bypass wiring portions WR3c and WG1c are adjacent to each other in the conductive layer CL2. The shortest distance from the bypass wiring portion WG1c to the bypass wiring portion GLc of the scan signal line GL is smaller than the shortest distance from the bypass wiring portion WG1c to the bypass wiring portion WR3c. In this case, the bypass wiring portion GLc of the scan signal line GL between the bypass wiring portions WR3c and WG1c functions as a shield for suppressing the capacitive coupling between the bypass wiring portions WR3c and WG1c. As a result, even when the writing signal is transmitted to the wirings WR3 and WG1 at the different timing from each other, the value of the parasitic capacitance between the bypass wiring portions WR3c and WG1c is smaller than at least 0.17 pF.

The structure example shown in FIG. 20 can be described as follows. That is, each of the bypass wiring portions WR1c and WR3c formed in the conductive layer CL2 overlaps the bypass wiring portion WR2c formed in the conductive layer CL3. Either one of the bypass wiring portions WR1c and WR3c overlaps the bypass wiring portion GLc of the scan signal line GL formed in the conductive layer CL1. The other of the bypass wiring portions WR1c and WR3c does not overlap the bypass wiring portion GLc of the scan signal line GL formed in the conductive layer CL1, and is arranged between the bypass wiring portions GLc that are adjacent to each other in the conductive layer CL1. To each of the wirings WR1, WR2 and WR3, the writing signal is transmitted at the same timing as one another.

Note that the wiring layout as described in the display apparatus DSP3 with reference to FIG. 14 is applicable as a modification example of the present embodiment although illustration is omitted. That is, as a modification example of the layout shown in FIG. 14, the bypass wiring portions WG1c and WG2c are formed in the conductive layer CL3 shown in FIG. 16 in some cases. As a modification example of the layout shown in FIG. 14, the position of the bypass wiring portion GLc of the scan signal line GL changes in some cases as similar to the example shown in FIG. 19 or the example shown in FIG. 20.

Incidentally, when the substrates 10 and 20 in the display region DA shown in FIG. 18 extend over the entire transparent region TRA, the liquid crystal layer LQ may exist in the transparent region TRA. For example, as a modification example of FIG. 18, the sealing member SLM is not formed in the frame region FRA in some cases. In such a case, it is unnecessary to provide the optical path UVP (see FIG. 19) for curing the sealing member SLM, and therefore, the structure shown in FIG. 16 is applicable.

Third Embodiment

Figure 21:
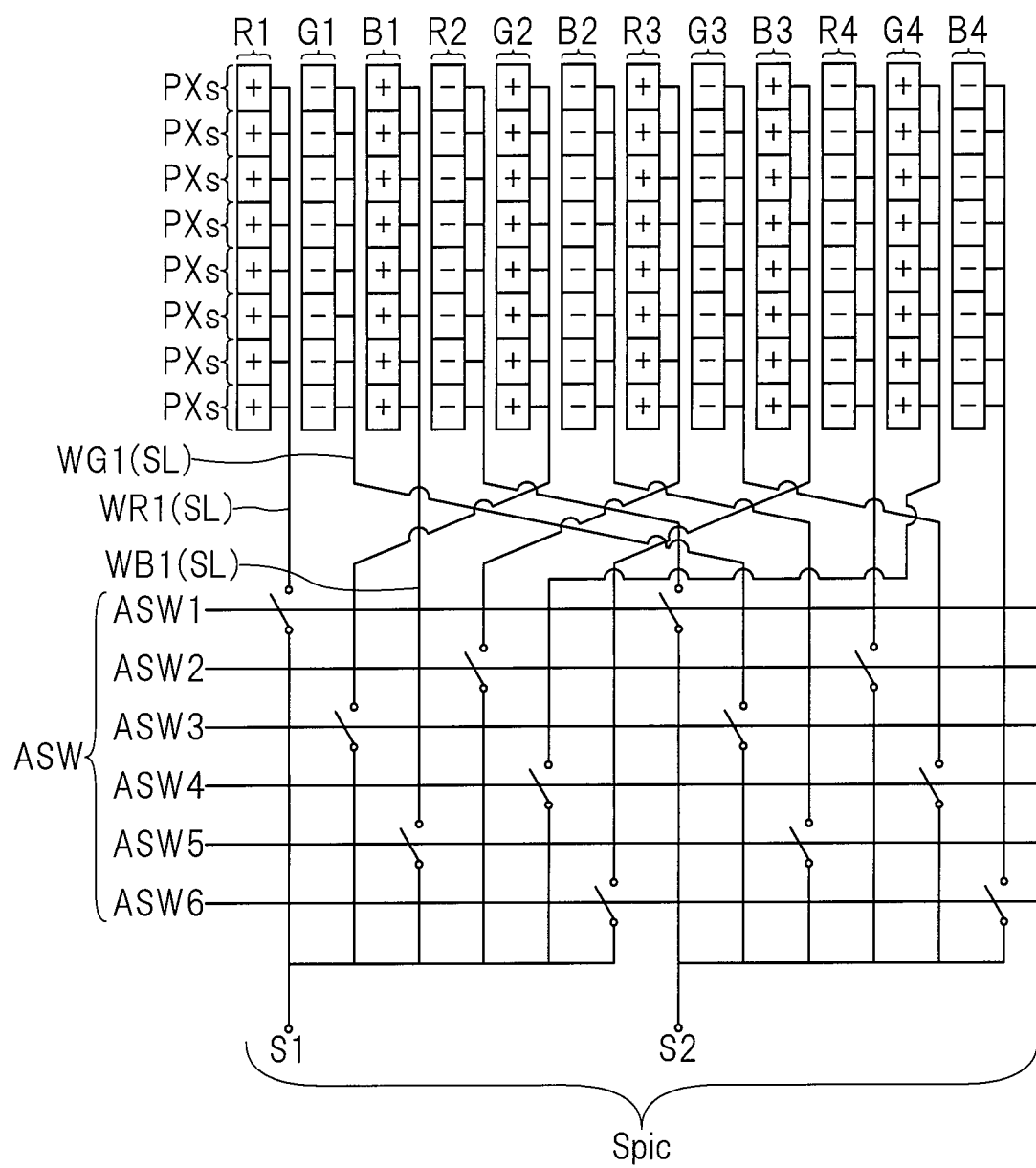
FIG. 21 is an explanatory diagram showing a conceptual illustration of an operational method of a signal selecting circuit that is a modification example of FIG. 5.

In the first embodiment, as shown in FIG. 5, the operation method of sequentially inputting one signal S1 or S2 to the three image signal lines SL by using the operation of the signal selecting circuit ASW has been described. Meanwhile, the operation of the signal selecting circuit ASW includes various modification examples. For example, as shown in FIG. 21 as a modification example, an operation method of sequentially inputting one signal S1 or S2 to every two of six image signal lines SL is also cited. In the example shown in FIG. 5, three switches ASW1, ASW2 and ASW3 are electrically connected to three signal lines SL that are branched from one signal line SL. On the other hand, in an example shown in FIG. 21, six switches (signal-line driving circuits) ASW1, ASW2, ASW3, ASW4, ASW5 and ASW6 are electrically connected to six signal lines SL that are branched from one signal line SL. In the present embodiment, a wiring layout around a frame region in a display apparatus driven by a signal selecting circuit shown in FIG. 21 will be described.

Figure 22:
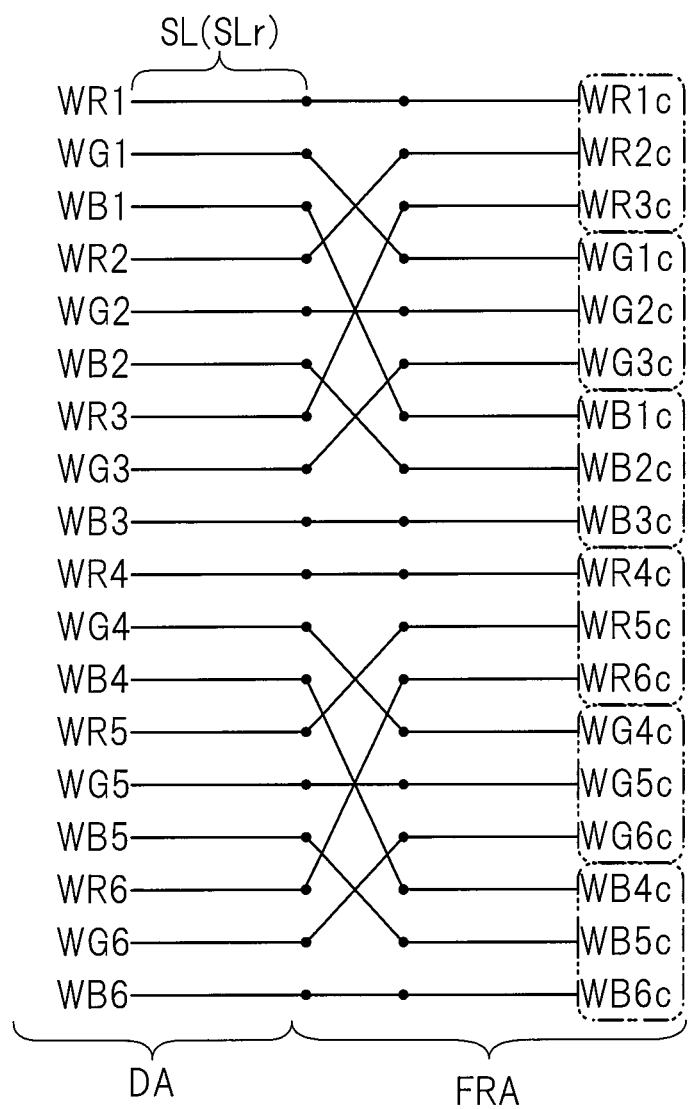
FIG. 22 is a conceptual diagram showing an example of an arrangement order of a plurality of image signal lines.
Figure 23:
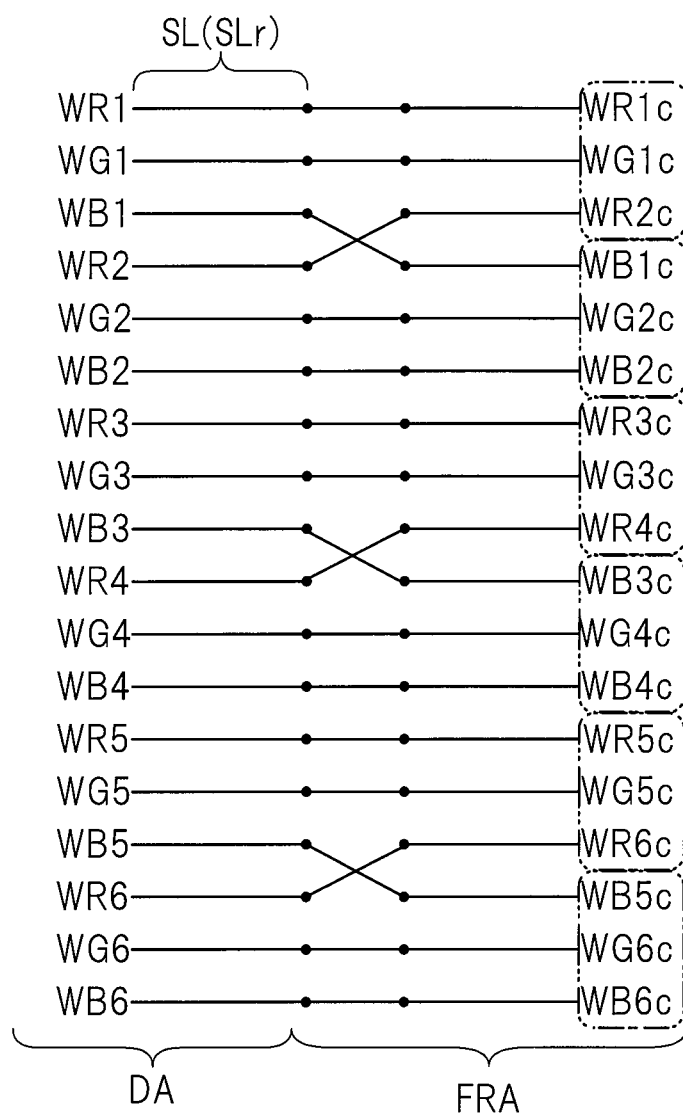
FIG. 23 is a conceptual diagram showing a modification example of a wiring layout shown in FIG. 22.
Figure 24:
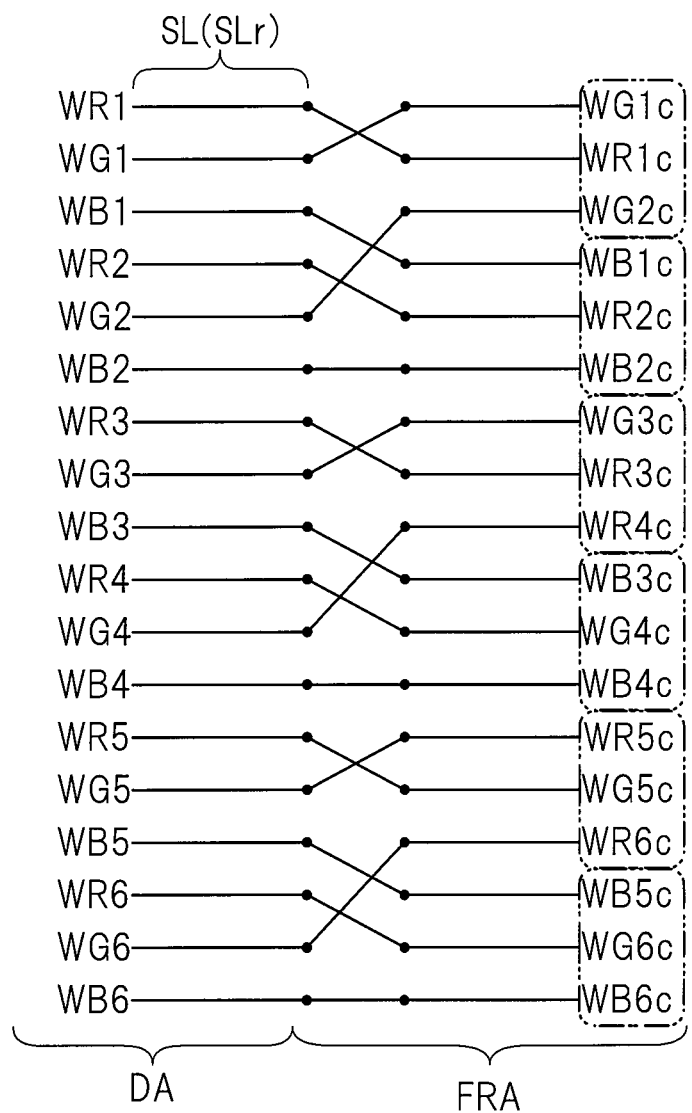
FIG. 24 is a conceptual diagram showing a modification example of a wiring layout shown in FIG. 23.

FIG. 21 is an explanatory diagram showing a conceptual illustration of the operational method of the signal selecting circuit that is a modification example of FIG. 5. Each of FIGS. 22 to 24 is a conceptual diagram showing an example of an arrangement order of a plurality of image signal lines. Each of FIGS. 22 to 24 schematically shows an arrangement order of the extension wiring portion SLr of the image signal line SL and the bypass wiring portion and shows a state in which the plurality of image signal lines SL intersect with one another, in replace of the enlarged plan view shown in FIG. 9 and others. In FIGS. 22 to 24, symbols of the bypass wiring portions that are collected to be a set (also referred to as block or group) for reducing the capacitive coupling such as the bypass wiring portions WR1c and WR2c shown in FIG. 10 are shown while being surrounded by a dashed double-dotted line.

An example of a wiring layout shown in FIG. 22 is similar to the wiring layout described with reference to FIGS. 13 and 15. In the case of the wiring layout shown in FIG. 22, three bypass wiring portions to which the writing signal is applied at the same timing as one another are collected to be the set.

An example of a wiring layout shown in FIG. 23 is similar to the wiring layout described with reference to FIG. 14. In the case of the wiring layout shown in FIG. 23, the bypass wiring portions WR1c to WR6c to which the red-color image signal is transmitted or the bypass wiring portions WB1c to WB6c to which the blue-color image signal is transmitted are arranged on either side of the bypass wiring portions WG1c to WG6c to which the green-color image signal is transmitted, respectively. In each set, the writing signal is transmitted to the bypass wiring portions on both sides of each of the bypass wiring portions WG1c to WG6c at the same timing as each other.

An example of a wiring layout shown in FIG. 24 is a modification example of the wiring layout shown in FIG. 23. In the case of the wiring layout shown in FIG. 23, the bypass wiring portions WG1c to WG6c to which the green-color image signal is transmitted or the bypass wiring portions WB1c to WB6c to which the blue-color image signal is transmitted are arranged on either side of the bypass wiring portions WR1c to WR6c to which the red-color image signal is transmitted, respectively. In each set, the writing signal is transmitted to the bypass wiring portions on both sides of each of the bypass wiring portions WR1c to WR6c at the same timing as each other. In the example shown in FIG. 24, the switch ASW1 of the switches ASW1, ASW2 and ASW3 shown in FIG. 21 is turned ON first. In other words, the writing signal is transmitted first to the bypass wiring portions WR1c to WR6c of the plurality of bypass wiring portions shown in FIG. 24 to be earlier than other bypass wiring portions.

The present invention can be utilized for a display apparatus.

What is claimed is:

1. A display device comprising:
a plurality of pixels arranged in a display region;
a first region, which is a non-display region, located inside of the display region;
a first conductive layer including a plurality of scan signal lines in the display region and a plurality of first bypass wiring portions in a frame region between the first region and the display region; and
a second conductive layer including a plurality of touch detection wirings in the display region and a second bypass wiring portion in the frame region,
wherein
the first bypass wiring portions are formed along the first region between the first region and the display region, and
in a transparent plan view, the second bypass wiring portion extends along the first bypass wiring portions and is located between two adjacent first bypass wiring portions.

2. The display device of claim 1, wherein the touch detection wiring is used as a route through which a detection signal for use in detection of a touch position is transmitted.

3. The display device of claim 1, wherein the first region is a region corresponding to a position where a camera overlaps.

4. The display device of claim 1, wherein the second bypass wiring portion extends parallel to the two adjacent first bypass wiring portions.

5. The display device of claim 1, further comprising:
a first image signal line,
wherein, in the frame region,
the first image signal line includes a first end and a second end,
the first image signal line is divided between the first end and the second end, and
the second bypass wiring portion connects between the first end and the second end.

6. The display device of claim 5, wherein
the first conductive layer is a different layer from the second conductive layer, and
the first image signal line is not included in the first conductive layer.

7. The display device of claim 4, wherein
the second bypass wiring portion does not overlap the two adjacent first bypass wiring portions.

8. The display device of claim 4, wherein
the second bypass wiring portion overlaps one of the two adjacent first bypass wiring portions, and
the second bypass wiring portion does not overlap another of the two adjacent first bypass wiring portions.

9. The display device of claim 4, wherein
a length of the second bypass wiring portion is shorter than a length of each of the two adjacent first bypass wiring portions.

10. The display device of claim 4, further comprising:
an organic insulating film provided between the first conductive layer and the second conductive layer.

* * * * *